United States Patent
Ariyoshi et al.

(10) Patent No.: US 8,218,948 B2
(45) Date of Patent: Jul. 10, 2012

(54) DIGITAL RECORDING/REPRODUCING DEVICE, COMPUTER PROGRAM, AND SERVER

(75) Inventors: Masayasu Ariyoshi, Tokyo (JP); Hitoshi Sakaguchi, Tokyo (JP); Takeru Komoriya, Tokyo (JP)

(73) Assignee: PTP, Inc., Tokyo (JP)

( * ) Notice: Subject to any disclaimer, the term of this patent is extended or adjusted under 35 U.S.C. 154(b) by 1440 days.

(21) Appl. No.: 11/576,241

(22) PCT Filed: Sep. 28, 2005

(86) PCT No.: PCT/JP2005/017902
§ 371 (c)(1),
(2), (4) Date: Mar. 28, 2007

(87) PCT Pub. No.: WO2006/035850
PCT Pub. Date: Apr. 6, 2006

(65) Prior Publication Data
US 2008/0031589 A1 Feb. 7, 2008

(30) Foreign Application Priority Data

Sep. 28, 2004 (JP) ................................. 2004-282668

(51) Int. Cl.
*H04N 5/92* (2006.01)
*H04N 5/78* (2006.01)

(52) U.S. Cl. ........................................ 386/326; 386/323
(58) Field of Classification Search .................. 386/326, 386/291, 297, 323, 353
See application file for complete search history.

(56) References Cited

U.S. PATENT DOCUMENTS 6,067,401 A * 5/2000 Abecassis ..................... 386/344

* cited by examiner

*Primary Examiner* — Robert Chevalier
(74) *Attorney, Agent, or Firm* — Michael A. Glenn; Glenn Patent Group

(57) ABSTRACT

The invention provides a digital recording/reproducing device wherein a reservation recording itself is not required and a viewer can search a desired target program quickly. The digital recording/reproducing device 10 comprises a plurality of tuners 12 which can receive a plurality of television signals at the same time, convert a television signal into a digital signal and records/reproduces. A server provides a time index having an identifier which can identify program data and program section data, and the time index is received via a communication means and recorded. In addition, a signal receiving unit 25 receives a program data reproducing signal from a remote controller and an input unit 28 for sending an input signal relating to the reproduction of program data. A control unit 18 detects an identifier of a time index corresponding to the program data reproducing signal that the signal receiver 25 receives, and extracts program data associated with the detected identifier from a recording means 17.

22 Claims, 10 Drawing Sheets

(a)

(b)

US 8,218,948 B2

DIGITAL RECORDING/REPRODUCING DEVICE, COMPUTER PROGRAM, AND SERVER

FIELD OF THE INVENTION

The invention relates to a digital recording/reproducing device, and in particular, relates to a technology of a digital recording/reproducing device wherein without complex instructions and/or operation for recording, recording errors do not occur.

BACKGROUND OF THE INVENTION

As a means for recording and a means for viewing TV program such as a ground wave and a satellite broadcasting, the following technologies are disclosed (refer to Japanese Patent Laid Open No. 1998-234007, Japanese Patent Laid Open No. 2003-101913, and Japanese Patent Laid Open No. 1997-245467). In Japanese Patent Laid Open No. 1998-234007, a technology to record all television broadcasts of a day has been proposed. In Japanese Patent Laid Open No. 2003-101913, a system has been proposed in which the server side records programs on all channels endlessly continuously for 24 hours and a user can receive the delivery of the recorded program from the server by designating a program that the user wants to view after broadcasting. In Japanese Patent Laid Open No. 1997-245467, a hardware for recording all programs on all channels has been proposed.
Japanese Patent Laid Open No. 1998-234007
Japanese Patent Laid Open No. 2003-101913
Japanese Patent Laid Open No. 1997-245467

DISCLOSURE OF THE INVENTION

Problems to be Solved by the Invention

In the Japanese Patent Laid Open No. 1998-234007, the recording capacity has one day, and the technology relates to compensating this shortage, assuming that the capacity of the hard disk which is a recording device is short, wherein the viewed program is deleted immediately to save the record capacity. However, this means that a viewer is asked if it may be deleted immediately after viewing and a problem in convenience occurs.

In addition, the Japanese Patent Laid Open No. 2003-101913 can conflict the current Copyright Law and is impractical.

Further, in the Japanese Patent Laid Open No. 1997-245467, even if the hardware for recording all programs on all channels has been proposed, a technique for viewing all the programs is not offered, which results in poor operability to a user. It has become very difficult to view all programs and to search a desired target program among from all the programs.

Now, while TV viewing shifts real time to recording viewing, operation for reserving and recording a program has remained troublesome in recent decades. In addition, recently a method of reservation recording using an electronic program list (hereinafter, referred to as EPG) is becoming popular. Because data of broadcast waves does not work with data of EPG, when a program is extended by a baseball broadcast or the like, even if reserved by using an EPG, the extension cannot be dealt with and there are many cases failing in recording. In addition, recently the recording machine which uses a high capacity hard-disk as a recording device becomes mainstream, but naturally mounting the high capacity hard-disk becomes very costly.

And if the number of programs recorded with such a high capacity recording machine increases, arranging and viewing the recorded and accumulated programs in itself becomes difficult.

The present invention has been proposed to overcome the above problems. It is an object of the invention to provide a digital recording/reproducing device, wherein a reservation recording itself of a program with complicated operability and a high risk to fail, is not required and a viewer can search a desired target program quickly. It is another object of the invention to provide a technique capable of saving the capacity of a hard-disk and enhancing the convenience. It is yet another object of the present invention to provide a technique capable of enhancing the operability and convenience of a user when viewing.

The invention of Claim 1 provides a digital recording/reproducing device wherein a viewer can search a desired target program and a program section quickly.

The inventions of Claims 2 and 3 provide a digital recording/reproducing device wherein a reservation recording itself of a program is not required.

The inventions of Claims 4 to 11 provide a digital recording/reproducing device capable of saving the capacity of a hard-disk and enhancing the convenience.

The inventions of Claims 12 to 21 provide a digital recording/reproducing device capable of enhancing the operability and convenience of a user when viewing.

The inventions of Claims 19 to 22 provide a digital recording/reproducing device which allows parents to control their children's TV viewing.

Means for Solving the Problems

The invention relates to a digital recording/reproducing device which comprises: a plurality of tuners which can receive a plurality of television signals at the same time; a converter by which the tuners convert a television signal into a digital signal; a recording means for recording program data converted by the converter; and a receiving means for receiving an operation signal relating to reproducing the program data recorded in the recording means from a remote controller, and which reproduces the program data on an output device based on the operation signal which the receiving means received.

The digital recording/reproducing device comprises: a time index receiving means for receiving a time index having an identifier which can identify the program data relating to a television signal and a plurality of program section data consisting of the program data, from a server for time indexes which stored the time index, via a communicating means; a time index recording means for recording a received time index in the recording means; and a controlling means for detecting an identifier of the time index relating to the program data corresponding to the operation signal which the receiving means receives, extracting the program data associated with a detected identifier from a recording means, and issuing an instruction for reproducing on the output device.
(Term Description)

A digital recording/reproducing device according to the invention is formed separately from a remote controller to send an operation instruction by using a radio signal and an output device to output a voice and a picture (so-called television).

"Multiple tuners" mean that there exist a plurality of functions which can tune a plurality of broadcast waves. It does not necessarily mean that there exist a plurality of devices. If a single electronic device (referred to as a multi-tuner) can perform the functions which can tune a plurality of broadcast waves, the multi-tuner is "multiple tuners".

A "converter" is either an A/D converter which converts from an analog signal to a digital signal or a D/A converter which converts from a digital signal to an analog signal.

A "recording means" is a data recording means such as a hard disk drive, a DVD, and a flash memory where random access is possible. Generally, data is compressed and then recorded. If data is compressed and then recorded, the compressed data is expanded at reproduction.

"Program data" is a broadcast wave which includes image data and voice data, and digital data converted from an analog signal to a digital signal via an A/D converter. In a digital broadcasting, an A/D converter is unnecessary.

"Program section data" stands for data obtained by subdividing program data depending on program content. For example, in case of a baseball broadcast, it shows a top of a first inning, a bottom of the first inning, a top of the second inning, a bottom of a second inning and so on. In case of news program, it shows each section such as top news, today's special feature, weather forecast, today's fortune telling, economic news and so on. Also, commercial messages (CM) between the respective sections are also included in it. That is, it is data of each section unit and CM unit.

"A time index" is an index associated with the program data and program section data. For example, a time index of the program data unit is created based on TV program lists (including newspapers and magazines) prepared by each broadcasting station in advance. For example, a time index of each section unit and commercial unit of the program section data is a detailed index created to the program data after broadcasting.

"A server for time indexes" is a server where a created time index is stored. A digital recording/reproducing device according to the invention accesses periodically a server for time indexes via a communicating means and asks whether there is the latest time index, and if so, download it.

An "operation signal" is a command signal to reproduce the program data by either a remote controller or an operation and input unit of the digital recording/reproducing device of the invention. When user operates directly the operation and input unit provided on the digital recording/reproducing device, the operation signal will be input directly. For example, when user selects the program data to wish from among the recorded program data and pushes a determination button, the operation signal is sent.

"An output device" is an output screen of the television which digital recording/reproducing device concerning present application was connected to electrically. In addition, in a remote controller (or an operation and input unit of the main body), an operation menu is generally output to the output device to designate the operation which is too complicated to display. In such an operation menu, general technologies such as a pull-down display, a prompt display of selection/determination by reverse or blink are used.

(Working)

A tuner sends a plurality of television signals received at the same time to a converter to convert the analog signals into digital signals. An encoder records program data converted into the digital signals in a recording means.

A time index receiving means receives a time index having an identifier which can identify program data and a plurality of program section data consisting of the program data, from a server for time indexes. The time index recording means records the time index in a recording means. If the receiving means receives an operation signal of the program data from a remote controller, the controlling means detects an identifier of the time index corresponding to the operation signal, and program data associated with the detected identifier is extracted from the recording means. The extracted program data is converted into analog signals by a D/A converter and is reproduced on the output device.

According to the digital recording/reproducing device of the invention, the time index is associated with the recorded program data and program section data, and thus the user can quickly return to the top per a program data unit, per each section unit in a program, per a commercial unit. In addition, the user can select and view only the section to want to view of the program to want to view. This results in remarkable improvement of the user's convenience in TV viewing.

The recording means can receive and record a television signal from the plurality of tuners continuously at least not less than 8 days.

(Working)

According to the invention, television signals from the plurality of tuners are recorded continuously at least for 8 days. This allows a user to do without programmed recording. At least 8 days are set because there are many programs broadcasted every week.

Because the program data for 8 days can be always recorded, all the television signals from all tuners are recorded and the user sets to overwrite and delete old data. Even if the user forgot to view the program data last week, he/she can view it on the day. Thus, because reservation operation itself becomes needless, problems such as recording errors do not occur.

The invention relates to the digital recording/reproducing device, wherein a plurality of tuners are not less than 8. This means that in addition to being provided with not less than 8 tuners physically, there is provided with the function which can tune not less than 8 broadcast waves.

(Working)

According to the invention, all channels which can be received are recorded continuously at least for 8 days. This allows a user to do without programmed recording. For example, to receive signals from 2 channels of terrestrial national broadcasting and 5 channels of commercial broadcasting, and a broadcasting station of satellite broadcasting of BS or CS, there are provided with not less than 8 tuners.

In the recording means, a ring buffer method is adopted where a data area is in a loop form, a data configuration is formed so that the area is handled as an area with hypothetically a limitless length, and program data to be recorded is recorded as one endless recording file every tuner.

The rink buffer method stands for a method where a data area in the recording means is administered in a loop form, and the data configuration is formed so that the area is handled as an area with hypothetically a limitless length, and the program data of a plurality of channels are recorded as one long endless file in the recording means.

(Working)

In a recording processing, a time index is produced simultaneously with recording to the ring buffer and is recorded with positional data on a recording medium continuously.

At the time of reproduction from a ring buffer, the user returns the top and reproduces based on the time index by the positional data. This makes the user return the top of a given scene effectively and reproduce the program smoothly.

The invention relates to the digital recording/reproducing device wherein a program genre is set and bit rate is changed automatics $11y$ to save the capacity of a recording means.

That is, the digital recording/reproducing device comprises a compressibility setting means for previously dividing the program data into a plurality of program genres and setting different compressibility every program genre; a program genre database where a plurality of divided program genres are associated with the compressibility set by the compressibility setting means and are recorded; a program genre discriminating means for discriminating whether program data newly received corresponds to the program genres in the program genre data base; a program data compressing means for compressing the program data with the compressibility of the corresponding program genre if the program data exists in the program genre data base; and a program data approximation compressing means for compressing the program data by the compressibility of the program genre to which the program genre is approximate if the program data does not exist in the program genre data base.

(Working)

According to the invention, the following steps are provided to save the capacity of the recording means. That is, the program genre dividing means previously divides the program data into a plurality of genres. The compressibility setting means sets the divided program data to different compressibility every program genre. A program genre/compressibility recording means associates the divided program genre with the compressibility set by the compressibility setting means and records into the program genre data base. The program genre discriminating means discriminates whether or not a plurality of program data received newly by the program data receiving means corresponds to the program genres in the program genre data base. If the program data exists in the program genre data base, a program data compressing means compresses the program data with the compressibility of the corresponding program genre. If the program data does not exist in the program genre data base, the program data approximation compressing means compresses the program data with the compressibility of the program genre to which the program genre is approximate. Thus, the program data is compressed with a preset compressibility every program genre, and if the record capacity of all programs for 8 days by always recording must be guaranteed, the satisfaction in viewing about image quality can be raised as compared with recording with a high compressibility uniformly. In other words, the competing problems of saving the capacity of an HDD and improving the image quality can be solved.

The invention relates to the digital recording/reproducing device for automatically reserving a free space of the recording means.

That is, the controlling means comprises the free space discriminating means which discriminates whether or not there is the free space needed to record the program data in the recording means; and the oldest data deleting means for deleting the oldest program data among the program data recorded in the recording means and reserving the free space if it is discriminated that the free space is short. And the recording means records the program data in the free space reserved by means of the oldest data deleting means.

(Working)

To record a lot of program data such as a plurality of channels, for 8 days, a very large record capacity is necessary, and the program data cannot be recorded, for example due to the image quality of the program data. In such case, according to the invention, the following steps are provided.

That is, the free space discriminating means discriminates whether or not there is the free space to record the program data. If it is discriminated that there is the free space, the program data may be recorded. If it is discriminated that the free space is short, the oldest data deleting means deletes the oldest data among the program data already recorded to reserve the free space, and the latest program data are recorded in the reserved free space. As a result, it is not necessary to consider the free space of the recording means, which results in improvement of convenience of the user.

The invention relates to the digital recording/reproducing device for reserving free space in a recording means when the recording means does not have the free space.

That is, in the digital recording/reproducing device, the controlling means comprises the free space discriminating means which discriminates whether or not there is the free space needed to record the program data in the recording means; and if it is discriminated that the free space to record a plurality of program data is short based on the free space discriminating means, the controlling means discriminates whether or not the program data corresponds to a program genre in the program genre data base, and compresses the program data with the compressibility of the corresponding program genre if the program genre of the program data exists in the program genre data base.

(Working)

In the invention, if there is not free space, old program data is deleted, but in the above invention, the capacity is reserved by compressing the program data depending on a program genre.

That is, if it is discriminated that a free space is short in the recording means to record the program data by the free space discriminating means, the controlling means compresses the program data with the compressibility of the corresponding program genre if the program genre of the program data exists in the program genre data base. As a result, it is not necessary to consider the free space of the recording means, which results in improvement of convenience.

The invention relates to the digital recording/reproducing device, wherein an EPG data recording means for acquiring and recording EPG data is provided. In addition, the controlling means comprises a record capacity discriminating means which calculates the total capacity required to record the program data for 8 days by means of EPG data recorded by the EPG data recording means and discriminates whether or not the calculated total capacity can be recorded in the total capacity of the recording means; and a compressibility changing means for changing the compressibility set by the compressibility setting means to compressibility to fit into the capacity recordable in the total capacity of the recording means if it is discriminated that the calculated total capacity exceeds the total capacity of the recording means.

(Working)

The invention relates to the digital recording/reproducing device for surely recording the program data for 8 days by previously receiving and previously calculating the total capacity required to record the program data for 8 days by means of EPG data recorded by the EPG data recording means.

That is, when the total capacity required to record the program data for 8 days is calculated, the record capacity discriminating means discriminates whether or not the calculated total capacity can be recorded in the total capacity of the recording means. If it is discriminated that the calculated total capacity exceeds the total capacity, a compressibility changing means changes the compressibility set by the compressibility setting means to the compressibility to fit into the capacity recordable in the total capacity of the recording means. In addition, as a logic of a compressibility change, for example, the higher quality image (=low compression) may be preferentially made low quality, and the compressibility may be uniformly changed by only the amount of overcapacity. As a result, regardless of the total capacity of the recording means, the program data for 8 days can be recorded surely.

The invention relates to the digital recording/reproducing device for preventing the previously recorded program data from being lost by overwriting, in the case of restoration when failures such as a power failure have occurred, by automatically backing up the record position of the program data.

That is, the controlling means comprises a record positional data grasping means for always grasping the record position of the program data recorded in the recording means during recording the program data in the recording means.
(Working)

The invention may copes with troubles such as power failure or unintended shut down, during the record positional data grasping means records the program data in the recording means, the record position of the program data recorded in the recording means is always grasped.

That is, the record positional data of the program data is periodically recorded in other file. Thus, after restoration from troubles such as power failure or unintended shut down, the record position of the program data in the other file is left, which prevents the previously recorded program data from being lost by overwriting.

The invention relates to the digital recording/reproducing device wherein the other program data having enough retention period left can be identified.

That is, there is provided with a retention expiration warning means for changing a color of the thumbnail or a font to display the program name about the program data if the retention period falls within the given period before expiration in the program data recorded in the recording means.

"The retention expiration warning means", for example, changes the color of the thumbnail of the program data from a color display into a black and white gradation display. Or, the font to display the program name of the corresponding program data is changed into an old font.
(Working)

For example, in the case of the retention period of 8 days by default, if the retention period is finished in two days to automatically delete the program data in the recording means, the color of the thumbnail of the program data changes. Or, the font to display the program name changes. A user can easily identify the program data wished to retain depending on the change of the time from a lot of program data recorded by always recording.

The invention may comprises a no signal detecting means for detecting whether or not a non-image signal exists in television signals received by the tuner, and a program data recording stop means for stopping a record instruction to the recording means if the non-image signal is detected.
(Working)

The no signal detecting means detects whether or not the non-image signal exists in the television signal received by a tuner. When the non-image signal is detected, the program data recording stop means stops the record instruction to the recording means. In a no signal condition in which a program is not broadcasted, recording is stopped to save the record capacity in the recording means. In addition, this results in longer life of the recording means.

In addition, the recording means is stopped once if the non-image signal is detected, and the recording means starts recording again if an image signal is detected.

The controlling means may comprises a menu displaying means for displaying a menu display for a user operation on the output device, and the menu displaying means comprises a top menu displaying means for displaying a menu about the first operation.

The recording means comprises an identifying ID data base where identifying IDs for identifying a plurality of users are recorded; and the receiving means comprises an identifying ID discriminating means for receiving an identifying ID sent from a button per individual provided in the remote controller and discriminating whether or not the identifying ID is a set identifying ID.

And, the control means discriminates whether or not a top menu of a user relating to an identifying ID is displayed if he identifying ID discriminating means discriminates that the identifying ID has been set, and makes an output device display a top menu if the top menu is not displayed.
(Term Description)

A "buttons per individual" is one of a plurality of buttons provided in a remote controller. To each of the buttons per individual, a button code is set, and when an operation instruction is sent by a remote controller, the signal corresponding to the button code is transmitted to a signal receiver. In the identifying ID data base, identifying IDs set per users and button codes for buttons per individual are associated with each other and are recorded.
(Working)

In the general digital recording/reproducing device (a general machinery), in the case of performing an operation of the recording/reproducing, the menu is layered from the top menu. That is, the procedure necessary for reproducing the program in the general machinery requires steps of "displaying the top menu→displaying the reproducing menu→selecting a program."

However, when a plurality of users such as a family share a general machinery, in a state where the reproducing menu is displayed, all playable program data recorded by a plurality of users are displayed. Therefore it is troublesome to select the program data in which a user is interested among them. Also, in the case of making directories per individual, as shown in "displaying top menu→displaying a reproducing menu→displaying individual menu→selecting program", one more step is added.

The invention relates to the digital recording/reproducing device, wherein a button and a menu screen assigned for each user are set, and a user can access a desired target program data by one-button. That is, the identifying ID discriminating means discriminates whether or not the identifying ID transmitted from buttons per individual is the set identifying ID with reference to the identifying ID data base. If an identifying ID had been set, the controlling means discriminates whether or not a top menu of a user relating to an identifying ID is displayed, and makes the output device display a top menu if the top menu is not displayed.

In the digital recording/reproducing device of the present invention, when the buttons per individual is pushed, the procedure becomes "setting buttons per individual on=displaying a menu per individual→selecting a program," by which the program data may be reproduced with very few operation, which will free the user from the inconvenience of sharing by a plurality of users.

Thus, a user can access a top menu customized exclusively for himself quickly only by pushing the buttons per individual where own favorite information is assigned, which results in improvement of convenience. When the digital recording/reproducing device is used by a plurality of users, particularly when it is shared by a family as a TV recording apparatus, the convenience is remarkably improved.

The controlling means may comprises a menu displaying means for displaying a menu display for a user operation on the output device; the menu displaying means comprises a top menu displaying means for displaying a menu about the first operation; and the top menu displaying means comprises a user selection menu which can select a particular user from a plurality of users.

And in the digital recording/reproducing device, the receiving means comprises a user selection menu signal receiving means for receiving a user selection menu signal sent when the remote controller or the input unit selects a particular user, and makes the output device display said user's own top menu based on the user selection menu signal received by the user selection menu signal receiving means.

"A user selection menu" stands for an interface displayed when a plurality of users using the digital recording/reproducing device are assigned.

When used by a family with 4 members, for example, "father", "mother", "elder sister", and "younger brother", any one of "father", "mother", "elder sister", and "younger brother" can be selected on the user selection menu. If "mother" is selected, a top menu screen customized exclusively for "mother" is registered (the registered content is recorded in a recording means), and a menu of the "mother exclusive use" is displayed on the top menu.
(Working)

According to the invention, each user can access a top menu screen customized exclusively for oneself quickly. This allows the operating procedure when viewing the program data to be simplified. In addition, when the digital recording/reproducing device is used by a plurality of users, particularly when it is shared by a family as a TV recording apparatus, the convenience is remarkably improved.

The controlling means may comprises a menu displaying means for making the output device output a menu display for a user operation; and the menu displaying means comprises a time and day determination menu comprised of a time selection menu where times from 1 o'clock to 24 o'clock can be selected in a pull-down fashion or a scroll fashion; a day selection menu where days from Sunday to Saturday can be selected in a pull-down fashion or a scroll fashion; and a determination button which is selected when the day and time are determined and has a function as the program data reproducing signal; and a time and day selection signal receiving means which receives a the time and day selection signal sent by selecting the given time from the time selection menu, selecting the given day from the day selection menu, and selecting the determination button in a remote controller or a input unit; and the controlling means extracts the program data corresponding to the time and day selection signal which the time and day selection signal receiving means received, from the recording means and makes the output device reproduce the program data.
(Working)

In the invention, if a user selects time and day and selects a determination button in the time and day determination menu, the program data corresponding to the selected time and day is extracted from the recording means and is reproduced. For example, if on Saturday, a user sets a time at 17:00, and a day on Wednesday, and selects a determination button, the program data recorded at 17:00 before three days is reproduced.

That is, a desired target program data can be reproduced simply by setting a time and a day, and even if a user has only ambiguous memory so that he/she does not recall the performer name, he/she can search the desired target program data in a short time without looking for it from a program list by roughly setting date.

In the digital recording/reproducing device of the invention, a means for recording for exclusive use of storing physically different from the recording means may be provided, and the controlling means makes the means for recording for exclusive use of storing store said program data based on the instruction to store the program data in the means for recording for exclusive use of storing. "A means for recording for exclusive use of storing" stands for a record field for exclusive use of storing physically different from the recording means. For example, when a recording means is a hard disk drive, a different storage area is DVD or another hard disk drive.
(Working)

In the invention, given program data are stored in the exclusive recording means provided as storage area different from the recording means. Hereby, it is prevented that important data are deleted by mistake. Or, the important data are isolated from deleting target in "automatic deleting function of the oldest data."

For example, an operation screen is provided as follows. A top menu displaying means comprises a program data storing menu, and the receiving means comprises a program data storing signal receiving means for receiving the program data storing signal sent when a program data storing menu is selected in the remote controller or the input unit. And the controlling means makes the means for recording for exclusive use of storing store the program data corresponding to the program data storing signal received by the program data storing signal receiving means.

For the program data that a user wants to store in particular, if a program data storing menu is selected, it can be stored. Of course, various setting article such as compressibility may be provided on the program data storing menu.

The controlling means may comprises a menu displaying means for making the output device output a menu display for a user operation, and the menu displaying means comprises a recommendation menu for recommending given program data to other users, and the receiving means comprises a recommendation program signal receiving means for receiving a recommendation program signal, which is sent when a recommendation menu is selected in the remote controller or the input unit and which includes data for specifying the program data. And in the digital recording/reproducing device, the controlling means sends the recommendation program signal which the recommendation program signal receiving means received via a network.

"Data for specifying the program data" relating to recommendation is data such as a program ID, a program title, a broadcasting data, and a broadcasting station.

The top menu displaying means comprises a recommendation menu for recommending given program data to other users; and the recommendation program signal, which is sent when a recommendation menu is selected in the remote controller or the input unit and which includes data for specifying a program such as a program ID, a program title, a broadcasting data and so on is sent to other users via a network.
(Working)

In the digital recording/reproducing device, when a user selects a recommendation menu, he/she can send data for specifying a recommendation program (such as a program ID, a program title, a broadcasting data, and a broadcasting station) to other users. The other users who received data for specifying the recommendation program via a network, reproduces the program data specified by the recommendation program signal in his/hers own digital recording device. In addition, it is desirable to use the Internet for sending. According to the digital recording/reproducing device, borrowing/lending among friends the recording medium which recorded program data becomes needless.

A favorite-flag that program data matches said user's favorite of the digital recording/reproducing device can be previously recorded in the recording means.

The top menu displaying means comprises a full automation menu, and the receiving means comprises an auto-reproducing menu signal receiving means which receives an auto-reproducing menu signal sent when an auto-reproducing is selected in the remote controller or the input unit.

The controlling means extracts program data relating to the favorite-flag from the recording means and makes the output device reproduce if the auto-reproducing menu signal receiving means receives the auto-reproducing menu signal.

In general, data on a favorite-flag is stored into a database if there are a plurality of users.
(Working)

A favorite-flag about program data matching user's favorite is recorded in the recording means. If an auto-reproducing menu is selected by a user, program data relating to a favorite-flag is extracted and is reproduced on the output device. A user can reproduce and enjoy program data matching his/her favorite without designating a program to be reproduced. If there are a plurality of program data relating to a favorite-flag, the program data is reproduced in a given order or in a random order.

More specifically, "a favorite-flag" is a function of randomly reproducing a predefined program group grouped every a certain particular genre or into similar kinds. For example, in a mode specifying "a child's favorite-flag", only the program for children is reproduced in a given order or in a random order. In addition, if "a favorite-flag" is "a BGV (a background video) mode", only the program where little conversation or quiet with beautiful scenes is reproduced in a given order or in a random order.

The invention may comprise a program database searching means for searching a program which is later or earlier than a currently reproduced program and which broadcast start time of the time index is the earliest or the latest in programs of the same channel from a data base if during reproduction of program data, the receiving means receives an access signal for performing the change per a program data unit and per a program section data unit, sent from the remote controller as an operation to show a next program or a previous program.

In the digital recording/reproducing device, the controlling means stops reproducing program data being reproduced if corresponding program data searched by the program database search means exists, and reproduces the corresponding program data to be searched on the output device without changing screens after stopping reproducing program data being reproduced.

Generally, "an Operation to show the next program or the previous program" is done by pushing a reproducing forward button, or a rewind button, or a "+ or –" button about channels provided with a remote controller. However, these are problems of agreements on buttons, and the kind of operation is not limited to the examples.
(Working)

A user performs the operation to show the next program or the previous program of a remote controller during reproducing program data. It is then assumed that the digital recording/reproducing device has received an access signal relating to the operation from a remote controller.

Then, in the digital recording/reproducing device, a receiving means receives the access signal, and a program database searching means searches a program which is later or earlier than a currently reproduced program, and which broadcast start time of the time index is the earliest or the latest in programs of the same channel from a data base.

The controlling means stops reproducing the program data being reproduced if corresponding program data searched exists. And after stopping reproducing program data being reproduced, the controlling mean reproduces the corresponding program data searched without changing screens such as returning to a menu screen. That is, it becomes possible to shift a program forward and backward without changing of screens, which results in improvement of convenience and operability.

The invention relates to the digital recording/reproducing device which allows channel switching (so-called zapping) at the time of past.

That is, there is provided with a program database searching means for searching the program of other channels which was broadcasted on the same day and at the same time as ones of said program being reproduced from a data base if during reproduction of program data, the receiving means receives an access signal for performing the change per a program data unit and per a program section data unit, sent from the remote controller as an operation to show a channel switching. In addition, in the digital recording/reproducing device, the controlling means stops reproducing program data being reproduced, if corresponding program data searched by the program database search means exists, and reproduces the corresponding program data searched on the output device without changing screens after stopping reproducing program data being reproduced.

Generally, an "operation to show channel switching" is to push buttons (a +, a – button about a channel) for incrementing or decrementing each digit showing a channel, provided with a remote controller. However, these are problems of agreements on buttons, and the kind of operation is not limited to the examples.
(Working)

It is assumed that during reproducing program data, a user sends an access signal for changing per a program data unit and per a program section data unit as the operation for channel switch of a remote controller. Then, in the digital recording/reproducing device, a receiving means receives the access signal, and a program database searching means searches the program of other channels which was broadcasted on the same day and at the same time as ones of the access signal from a data base.

The controlling means stops reproducing program data being reproduced, if corresponding program data searched exists. And after stopping reproducing program data being reproduced, the controlling means reproduces the corresponding program data searched without changing screens. That is, the corresponding program data is reproduced corresponding to the same time as the past time when the program being reproduced was broadcasted, without changing screens such as returning to a menu screen. That is, it becomes possible to shift a program per broadcasting station broadcasted at the same time (so-called zapping), which allows a user to enjoy a program of the past with a sense of real time.

The invention may comprise a rating list recording means for previously recording a rating list, and the controlling means can display a rating and a list from the rating list recording means on the output device.

There is provided with a rating list searching means for searching program data which is in the next or previous order of the program data being reproduced by the output device, if during reproducing a program relating to the listing, the receiving means receives an access signal for performing the change per said rating unit, sent from the remote controller as an operation to show the next program or the previous program.

In the digital recording/reproducing device, the controlling means stops reproducing the program data being reproduced if the program data relating to the selection using rating or list as results searched by the rating list searching means exists, and reproduces the corresponding program data searched on the output device without changing screens after stopping reproducing the program data being reproduced.

"A rating list" is the general term of data presented in rating data and a given list such as an audience rating and a popular list by a particular viewer group.

In the case of real time viewing, because audience rating and popular list as a result collected on viewing cannot be available, viewing based on rating list is not possible, but the digital recording/reproducing device of the present application makes it possible. The invention improves the convenience in viewing based on rating list. That is, the invention allows program data based on the order of rating list to be continuously reproduced without changing screens.

(Working)

Some rating and list is stored in the rating list memory means. It is assumed that a user selects one program from some rating and list to list recorded programs, reproduces the program data, and views the program data selected from the rating and list. During the reproduction, the user operates a remote controller and sends a signal for designating the next program or the previous program. Then, a receiving means of the digital recording/reproducing device receives an access signal for performing the change per a program data unit and per a program section data unit. On the other hand, a rating list searching means searches the next or previous program of the program being now reproducing in the latest rating and list which a rating list memory means stores. If there is a useful program as searched results, the controlling means stops reproducing the program data being reproduced, and reproduces the program data deemed useful as a searched result without changing screens such as returning to a menu screen after stopping the program being reproduced.

For example, while reproducing the 5th rated program data among the rated program data with the high audience rating in a week, a user may reproduce the 4th rated program by pushing the next list button without changing screens, and reproduce the 6th rated program by pushing the previous list button without changing screens. That is, the user may view the rated and listed program data in turn without returning to the top menu, which results in remarkable improvement of convenience and operability when using the digital recording/reproducing device 10.

The invention relates to the digital recording/reproducing device.

The time index receiving means receives a given time index where only given scene of program data is extracted and a digest edition time index comprising time indexes of a plurality of extraction scenes, and the time index recording means records a received given time index and a digest edition time index.

The controlling means makes the output device reproduce based on instructions relating to a given time index or a digest edition time index and.

(Working)

Time indexes of section and scene in a program are previously created. A time index receiving means receives such a given time index and a digest edition time index and the time index recording means records them.

In that case a user sends instructions relating to the given time index or the digest edition time index via a remote controller in the digital recording/reproducing device. A receiving means of the digital recording/reproducing device receives the instruction, and the controlling means makes the output device reproduce it based on the instruction.

Then the user can pick up only the program section and the given scene designated by a digest edition time index among a large quantity of program data recorded in the digital recording/reproducing device and view the program.

The invention relates to the digital recording/reproducing device which performs viewing administration to a particular user by time.

The invention is provided with a viewable total time setting means for setting a viewable total time when a user can view program data and a viewable total time discriminating means which discriminates whether or not a set viewable time is reached; the viewable total time set to a particular user and the result discriminated by the viewable total time discriminating means are recorded in the identifying ID data base; and the controlling means controls so that the reproduction of program data or the output by the output device becomes impossible, if the viewable total time is reached.

"A particular user" stands for a user who only uses the digital recording/reproducing device for an administrator having administration right such as various setting of the digital recording/reproducing device. For example, if an administrator is a parent, a particular user is often a child.

"Total time" is a limited time for a given time, for example, 2 hours for 24 hours, 15 hours for 168 hours (one week).

If a control object by the controlling means is "output by the output device," viewing administration of not only recorded program data but also the total time including real time viewing is enabled.

(Working)

The viewable total time is set and it is discriminated whether or not the limited time is reached. Here, if the limited time is reached, it becomes impossible to reproducing program data. That is, if "viewable total time for a given time" is exceeded, it automatically becomes impossible to view. For example even if an administrator (guardian) of the digital recording/reproducing device goes out, the administration of a viewing time (so-called, heavy TV viewing) of a particular user (a child) becomes needless.

The invention relates to the digital recording/reproducing device wherein viewing administration of a particular user is performed using points.

The invention is provided with a user viewing point which is increased or decreased depending on good and bad of a behavior pattern of a particular user and a point setting means for setting a viewable point required to view each program data; the identifying ID data base records a user viewing point set for a particular user by a point setting means; a recording means records a viewable point corresponding to each program data; and the controlling means controls so that the reproduction of program data or the output by the output device becomes impossible, if the user viewing point recorded in the identifying II) data base is not reached the viewable point required to view the program data relating to reproduction instruction.

A point setting means can set a viewable point for each program data and further can set it every genre if programs is classified according to the genre. User viewing points can be set depending on behavior patterns of a particular user. For example, depending on daily activities that the particular user got good grades or high test score, or did his/her homework, or the particular user got bad grades or low test score, forgot to do his/her homework, or quarreled with his/her friend, user viewing points can be increased or decreased.

(Working)

By means of a point setting means, an administrator (parent) as a user sets a viewable point for each program data, and sets the viewable point which is increased or decreased depending on good and bad of behavior patterns of a particular user (a child) under the control of the administrator.

The identifying ID data base records the user viewing point set relating to the particular user by the point setting means. And a recording means records a viewable point corresponding to each program data.

If the user viewing point recorded in the identifying ID data base is not reached the viewable point required to view the program data relating to reproduction instruction, the reproduction of program data or the output by the output device becomes impossible.

For the program genre which an administrator (parent) of a user does not want to show to a particular user (a child) positively, if the administrator sets a higher viewable point than other programs by means of the point setting means, the particular user cannot easily view the program data.

The invention relates to the digital recording/reproducing device wherein viewing administration is performed using rating data and a quiz program.

The invention is provided with a server receiving means for receiving a quiz for education for a particular user and the correct answer delivered by a server; and the controlling means makes the output device output the quiz for education which the server receiving means received; the receiving means receives answer data sent by the particular user; and if the correct answer does not correspond with the answer data at above a given rate, the controlling means controls so that the reproduction of program data or the output by the output device becomes impossible.
(Working)

A server receiving means receives a quiz for education for a particular user and the correct answer delivered by a server and the output device outputs the quiz for education. The particular user sends answer data for the quiz, and the receiving means receives the answer data. If the correct answer does not correspond with the answer data at above a given rate, the reproduction of program data or the output by the output device becomes impossible.
(Variation)

Rating data which shows rating classification is previously applied to a program, and this can be used as a function to restrict viewing depending on this rating data.

For example, a user (an administrator) rates program data previously, and make a recording means record the rating data corresponding to program data. It is assumed that a program's rating is classified into three groups of pine, bamboo, and plum (A, B, C). In addition, requiring one point of "viewable point" to view a program with "rating pine (A)", requiring two points of "viewable point" to view a program with "rating bamboo (B)", and requiring three points of "viewable point" to view a program with "rating plum (C)" are recorded.

"Rating plum (C)" corresponds to a program as referred to as so-called a tabloid show, and an administrator can restrict the program which has the adverse effect from an educational standpoint. That is, if the number of points obtained by answering a quiz for education does not reach 3 points, the particular user (the child) cannot view a so-called tabloid show.

The rating of program data may be set and delivered via a serve by a person providing a quiz for education.

In addition, the person who provides the quiz for education prepares a plurality of quizzes for education by age (scholastic year) or ability of a particular user, and delivers problems which can be solved if the particular user only does his/her school's homework as quizzes for questions. The particular user has to answer a quiz correctly to view the desired program, and further has to study and do homework to solve the quiz. Thus, the particular user can be expected to study spontaneously rather than forced to study by administrator.

The invention relates to the digital recording/reproducing device, wherein viewing administration is performed by means of recommendation program.

That is, there is provided with a server receiving means for receiving data specifying a program about a recommendation program for a particular user delivered by a server; and the receiving means receives a user ID for specifying a user relating to the recommendation program from a plurality of users; the controlling means makes the output device output the program data relating to the data specifying a program which is received by the server receiving means, if the receiving means received the user ID; and the controlling means controls so that the reproduction of other program data or the output by the output device becomes impossible, if both the reception of a given user ID and the successful completion of the program data output are not satisfied.
(Working)

The server receiving means receives the data specifying a program about the recommendation program for the particular user delivered by a server. If the receiving means receives a user ID for specifying a user relating to the recommendation program from the plurality of users, the controlling means makes the output device output the program data relating to the data specifying a program which is received by the server receiving means.

If both the reception of a given user ID and the successful completion of the program data output are not satisfied, the reproduction of other program data or the output by the output device becomes impossible. That is, viewing "the recommendation program" sent by the server allows the particular user to view other programs. This allows the administrator to make the child semi-forcefully view the program which the administrator wants the particular user to view, so the digital recording/reproducing device can be used as an education auxiliary.

In addition, a recommendation program may be provided with the function which can previously flag a recommendation-flag for the program data by a user (an administrator). This allows a particular user (a child) to be managed without waiting for delivering from the server.

The invention relates to a control program of the digital recording/reproducing device which comprises: a plurality of tuners which can receive a plurality of television signals at the same time; a converter by which the tuners convert a television signal into a digital signal a recording means for recording program data converted by the converter; and a receiving means for receiving an operation signal relating to reproducing the program data recorded in the recording means, and which reproduces the program data on the output device based on the operation signal which the receiving means received.

The control program is a computer program which makes a controlling computer of the digital recording/reproducing device execute: a time index receiving procedure for receiving a time index having an identifier which can identify the program data and a plurality of program section data consisting of the program data, via a communication means from a server for time indexes connected via the communication means; a time index recording procedure for recording a received time index in the recording means; a signal receiving procedure for receiving an operation signal from a remote controller; and a controlling procedure for detecting an identifier of the time index relating to the program data corresponding to the operation signal received by the signal receiving procedure, extracting the program data associated with a detected identifier from a recording means, and issuing an instruction for reproducing on the output device.

Obviously, it is possible to provide the inventions of the control program corresponding to the digital recording/reproducing device. In addition, a computer program or control programs corresponding to the digital recording/reproducing device can be recorded on a storage medium and provided.

Here, a "Storage medium" stands for a medium which can record a program which itself cannot occupy space, for example, a flexible disk, a hard-disk, a CD-R, a MO (a magnetic optical disk), a DVD-R.

In addition, the program relating to this invention can be sent from a computer which stores it to a computer of other digital recording/reproducing device via a communication line.

The invention provides a server for sending information processing about a TV program, the processed information and additional information to the digital recording/reproducing device.

The digital recording/reproducing device comprises: a plurality of tuners which can receive a plurality of television signals at the same time; a converter by which the tuners convert a television signal into a digital signal; a recording means for recording program data converted by the converter; and a receiving means for receiving an input signal relating to the reproduction of program data from a remote controller, and which reproduces the program data on the output device based on an input signal relating to the reproduction that the receiving means received.

A server comprises: a time adjusting means for periodically sending time data to adjust the time of a clock of the digital recording/reproducing device; a time index sending means for sending a time index to be applied to program data recorded in a recording means of the digital recording/reproducing device; and a program data sending means for sending data specifying a program for specifying the program data and data specifying a section for specifying program section data to the digital recording/reproducing device.

For the server, the following configuration can be added.

That is, the server comprises: a program data sending means for sending data specifying a program for specifying the program data and data specifying a section for specifying program section data to the digital recording/reproducing device; a user information receiving means for receiving the time index which the user created from the digital recording/reproducing device and viewing information; a processed information generating means for generating processed information by processing the received time index and viewing information; and a time index delivering means for delivering generated processed information and a time index before processing to the digital recording/reproducing device.

"Viewing information" stands for information that a reproduction channel, reproduction date, reproduction status (normal reproduction, forward, rewind, etc.), a reproduction user identifier, a terminal identifier, program status (my menu ?, saved ?, designated by a time index ?), program assessment data (good or no-good), and recommendation data by viewer are recorded in seconds.

A "data specifying a program" stands for, for example, the broadcast wave which includes digital data converted from an analog signal to a digital signal via an A/D converter, and which also includes image data and voice data.

A "data specifying a section" stands for data of each section unit and CM unit of program data. In addition, it stands for data on data for specifying a given section in a certain program, for example, the time until the section will start as well as the broadcasting channel and the broadcast start time of the program, or, the broadcasting channel of the program and the broadcast start time of the section.

"Processed information" stands for information collected and processed based on information such as a time index, a topic index of programs, assessment data, a quality of viewing, an audience rating, and number of viewers which are generated by statistically processing data such as blogs or bulletin boards on Internet, other than information processed based on viewing information.

For example, if key words such as "a program name" or "a performer's name" in the writing posted to a blog and a bulletin board, are picked up and the number of cases is collected, the program name having higher number may be referred to as "a hypertrendy program" or "a program with trendy actors". Obviously, it is possible that such collected and processed information is delivered from a server.

A time adjusting means periodically adjusts with the time of the digital recording/reproducing device. A time index sending means sends a time index to the digital recording/reproducing device. Data specifying the program for specifying program data and data specifying the section for specifying program section data are sent to the digital recording/reproducing device.

A user information receiving means receives the time index that the user created and viewing information from the digital recording/reproducing device. The processed information generating means processes the received time index and viewing information to generate processed information.

The time index delivering means delivers the generated processed information and the time index before processing to the digital recording/reproducing device.

Effect of the Invention

According to the invention as claimed in Claim 1, a digital recording/reproducing device wherein a viewer can search a desired target program and a program section quickly can be provided.

According to the inventions as claimed in Claim 2 and Claim 3, a digital recording/reproducing device wherein a reservation recording itself is not required can be provided.

According to the inventions as claimed in Claims 4 to 11, the digital recording/reproducing device which can save the capacity of a hard-disk and enhance the convenience can be provided.

According to the inventions as claimed in Claims 12 to 21, the digital recording/reproducing device which can enhance the operability and convenience of a user when viewing can be provided.

According to the inventions as claimed in Claims 19-22, the digital recording/reproducing device which allows parents to control their children's TV viewing can be provided.

BRIEF DESCRIPTION OF THE DRAWINGS

FIG. 3 (*a*) is program section data and FIG. 3(*b*) is CM information.

EXPLANATION OF SIGNS

Figure 1:
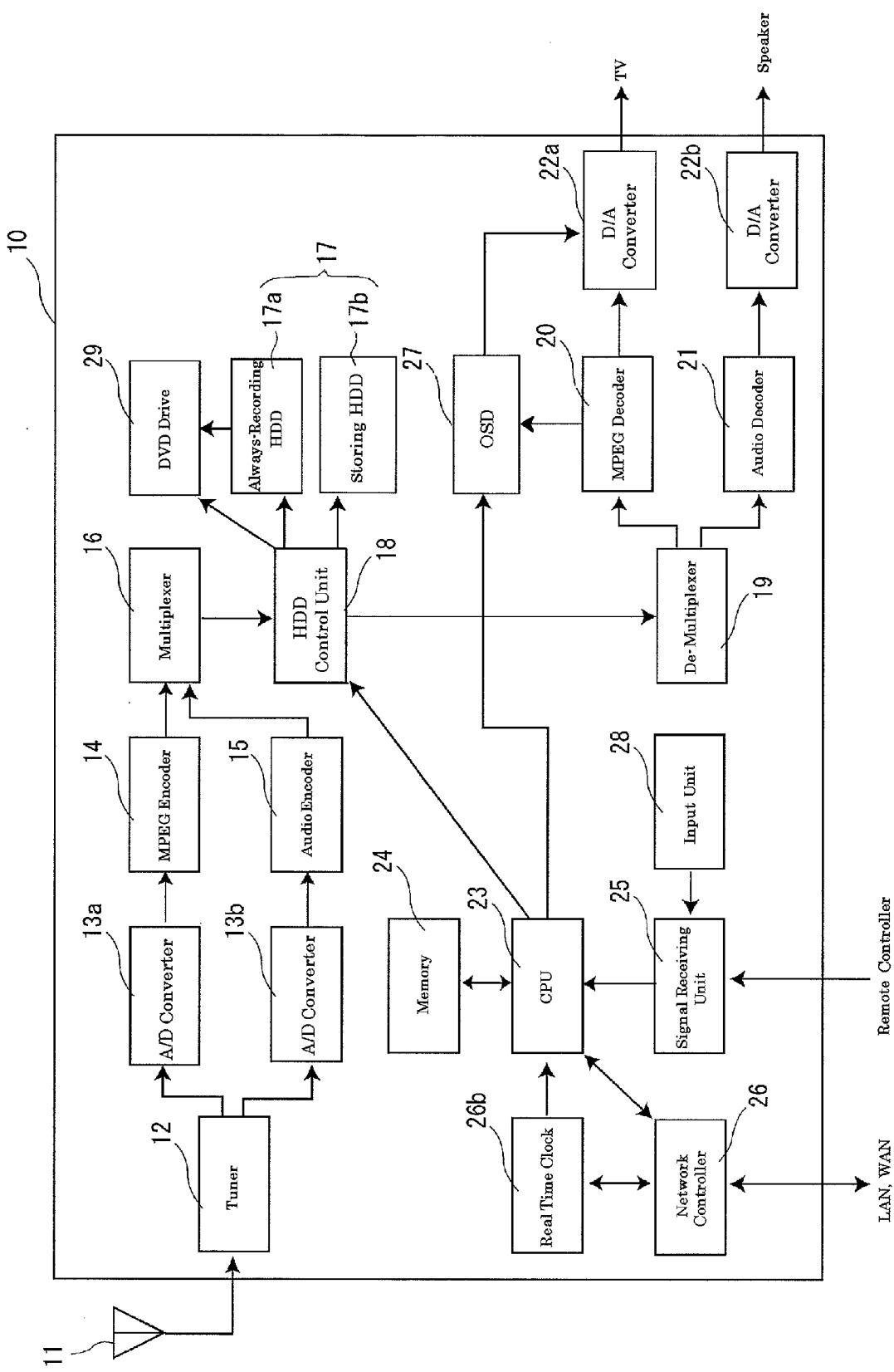
FIG. 1 is a block diagram showing a hardware configuration of the digital recording/reproducing device.

10: digital recording/reproducing device
11: antenna
12: tuner
13*a*,13*b*: A/D converter
14: MPEG encoder
15: audio encoder
16: multiplexer
17: HDD
17*a*: an always recording HDD
17*b*: HDD for storage
18: HDD control unit
19: demultiplexer
20: MPEG decoder
21: audio decoder
22: D/A converter
23: CPU
24: memory
25: signal receiving unit
26: network controller
26*b*: real time clock
27: OSD
28: input unit
29: DVD drive
50: server for time indexes

BEST MODE FOR PERFORMING THE INVENTION

The digital recording/reproducing device 10 of the present invention is the device wherein a plurality of tuners which can receive a plurality of television signals at the same time, compresses program data converted by a converter which converts the television signal into a digital signal; the program data is recorded in the hard disk drive (a recording means); and the compressed program data is expanded and reproduced on the output device based on the reception of an input signal relating to the reproduction of the compressed program data. "An output device" stands for an output screen of a television electrically connected to the digital recording/reproducing device of the present application.

In addition, the digital recording/reproducing device 10 is equipped with a recording function, but has no function that the user performs recording of the TV program newly by default (optionally supported), that is, the TV program of broadcasting stations corresponding to the tuner 12 is being always recorded for 24 hours for 365 days.

The "always recording" stands for a function in which the digital recording/reproducing device 10 records the TV program automatically without setting a recording operation by the user. Each function of each part in the digital recording/reproducing device 10 is explained in detail as follows.

(Digital Recording and Reproducing Device)

A hardware configuration of the digital recording/reproducing device 10 is shown in FIG. 1. The digital recording/reproducing device 10 comprises: an antenna 11 for receiving television signal radio waves; a plurality of tuners 12 for selecting the radio waves of the channel designated by the user from the radio waves received by the antenna 11, and demodulating it into the analog television signal; an A/D converter 13*a*, 13*b* for converting the analog signal from the plurality of tuners 12 respectively into digital image and audio signals; an MPEG encoder 14 for receiving the image signal among the digital signals converted by an A/D converter 13*a* and 13*b*.

Furthermore, the digital recording/reproducing device 10 comprises: an audio encoder 15 for receiving audio signals; a multiplexer 16 for receiving the image signal and the audio signal which are compressed and encoded by the MPEG encoder 14 and the audio encoder 15, multiplexing the compressed and encoded streams, and converting them into the MPEG system stream; a plurality of randomly accessible hard disk drives 17 (17*a*, 17*b*) (referred to as "HDD", hereinafter); and a HDD control unit 18 for recording data, reading data and performing various controls for the HDD 17.

Furthermore, the digital recording/reproducing device 10 comprises: a demultiplexer 19 for separating MPEG streams read out from the HDD 17 into image signal streams and audio signal streams; an MPEG decoder 20 for receiving image signal streams; an audio decoder 21 for receiving the audio signal stream; a digital-analog (D/A) converter 22*a* for receiving the image signal stream decoded by the MPEG decoder 20, converting the received image signal into the analog signal, and outputting it into a TV; and a D/A converter 22*b* for receiving the audio signal stream decoded by the audio decoder 21, converting the received audio signal into the analog signal and outputting it into a speaker and such.

The digital recording/reproducing device 10 is further provided with: a CPU 23 for controlling the entire digital recording/reproducing device 10; a memory 24 used as a working area of the CPU 23 and a working area for storing temporarily the system stream, and recording them to the HDD 17; a receiving unit 25 for receiving various input signals from a remote controller or an input unit 28 of the main body in the digital recording/reproducing device, and sending the input signal into the CPU 23; and a network controller 26 (a communication means) connected with a LAN and a WAN which can perform Internet communication.

The digital recording/reproducing device 10 is further provided with: a real time clock 26*b* for accessing to a server using an NTP (Network Time Protocol) of the network controller 26, inquires the present time and synchronizing time data; an OSD (On Screen Display) 27 for keeping to display a reproducing display even when an input signal of command to display the top menu screen is sent while the program data being reproduced or edited, and the top menu being displayed, and displaying the top menu screen such that it is overlapped on the menu while the menu display being displayed; and a DVD drive 29 for recording the recorded program data on the optical disk (a recording means) such as a DVD.

The network controller 26 is connected to the Internet via LAN and WAN, enabling data transmission and reception with servers (server for time indexes 50 as described below) on the Internet. As the main functions, it is at least possible to receive the program data by an EPG, to receive the program configuration data and a time index, to transmit the user's view data, and to receive date data and time data using a NTP (Network Time Protocol).

Since the tuner 12 comprises 8 tuners, it is possible to browse and record 8 TV programs at maximum. For example, in addition to 1, 3, 4, 6, 8, 10, 12 channels, which are ground waves in Tokyo District, broadcasting stations of a satellite broadcasting such as a BS or a CS may be covered. As an example, the tuner 12 comprises 1 tuner board where 8 tuners are installed and 2 encoder boards where encoders enabling to process 4 image signals at the same time are installed.

Alternatively, the following configurations are also possible: 1 tuner board where 8 tuners are installed and 4 encoder boards where 2 image signals are processed at the same time; 2 tuner boards where 4 tuners are installed in 1 tuner board and 4 encoder boards where 2 image signals are processed at the same time and 2 tuner boards where 4 tuners are installed in 1 tuner board and 2 encoder boards where 4 image signals are processed at the same time. In addition, although 8 tuners 12 are installed in this embodiment, it is not particularly limited to this, but is possible to increase or decrease the number of tuners if necessary.

The HDD 17 comprises 2 HDDs, an always recording HDD 17a for always recording, and a storing HDD 17b (an means for recording for exclusive use of storing) to store the recorded program data. The always recording HDD 17a has capacity corresponding to 8 tuners described above. In other words, it enables recording for 8 days so that it is formed as the capacity is enough for TV programs with 8 tuners to be recorded. In fact, program data can be recorded for (24-hours×8 days)×8 tuners=1,536 hours.

The program data which the user wishes to store can be stored in the storing HDD 17b, and the program data will be stored considering a bit rate when the user selects the desired program data. The program data stored here can be output to the outside recording device, the optical disk of the DVD drive 29.

In addition, although the HDD17 has 2 HDDs physically, it is not restricted to this. For example, an embodiment of 1 HDD where one HDD is separated by partition (another area) is possible. Also, the HDD17 can be extended if necessary. For example, the extended HDD may be used as a storing HDD, a HDD for editing program data, or a working HDD at the time of recording on optical disks such as a DVD.

(Time Index)

Next, a recording form of program data will be described.

The program data which is broadcasted on each channel is recorded endlessly for 365 days, for 24 hours on the always recording HDD17a. This adopts a recording form of a ring buffer method. The ring buffer stands for a data configuration where a data area such as a HDD is administered in a loop form, and the area is handled as an area with hypothetically a limitless length. On the always recording HDD17a, the program data of a plurality of channels is recorded as one long endless file. In addition, in a conventional digital recording/reproducing device, one program recorded on an HDD is recorded as one file, but in this embodiment, the program is reproduced using a time index stored in another medium physically different from that of the program data recorded by ring buffer method.

Here, "a time index" stands for an index associated with the program data and program section data. A time index of the program data unit is created based on TV program lists (including newspapers and magazines) prepared by each broadcasting station in advance, and for example, a time index of each section unit and commercial unit of the program section data is a detailed index created to the program data after broadcasting.

Figure 2:
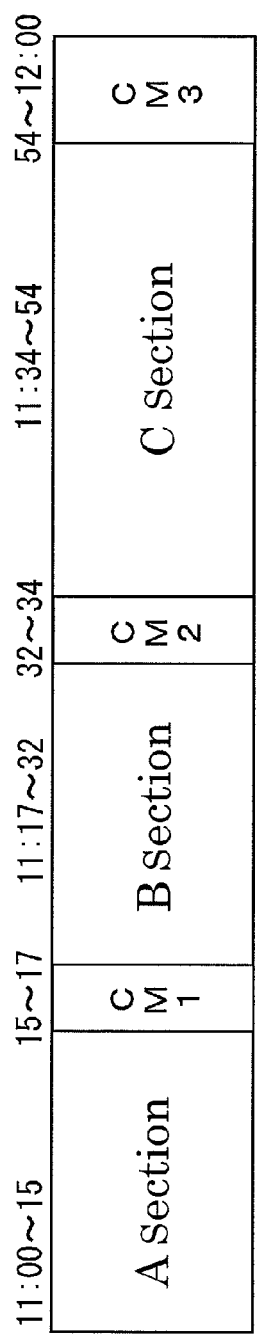
FIG. 2 is a schematic diagram showing an identifier of a time index.
Figure 3:
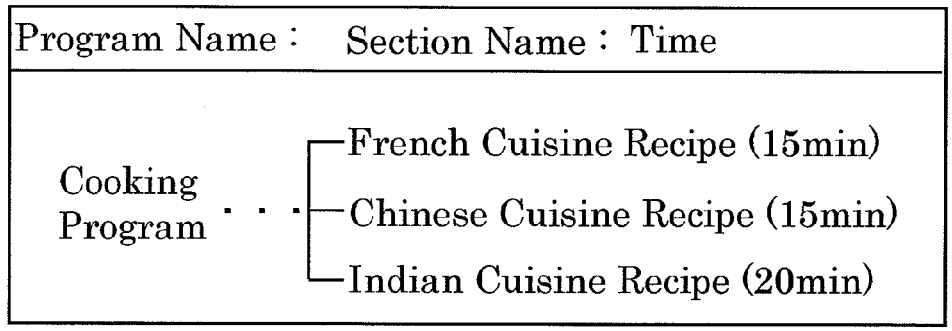
FIG. 3 is a schematic diagram showing a time index.
Figure 3:
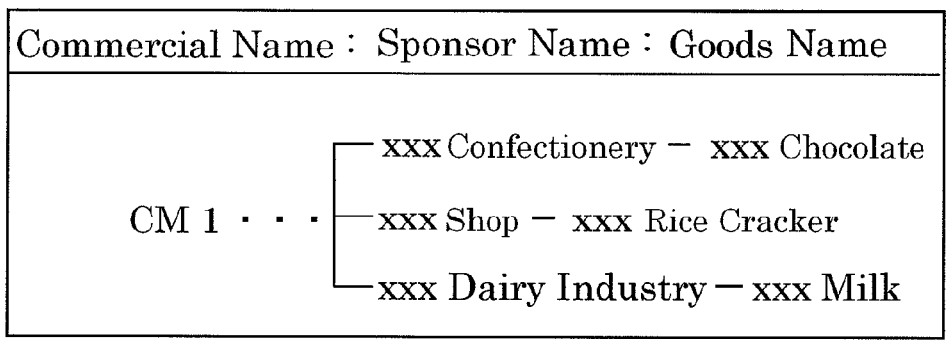

(FIG. 2 and FIG. 3)

Referring to FIG. 2 and FIG. 3, the relationship between program data, program section data, and a time index will be described. FIG. 2 sequentially shows the content of a cooking program broadcasted between 11:00 and 12:00. This cooking program is composed of 3 sections "A to C" and commercials "CM1 to CM3" broadcasted between each section.

That is, the program data as described above shows the entire cooking program, and the program section data stands for the A to C sections that are content of the cooking program and the CM3 to CM1.

First, the "A section" is broadcasted between 11:00 and 11:15, the "CM1" for 2 minutes from 11:15 is broadcasted, and the "B section" is broadcasted between 11:17 and 11:32. Then, the "CM2" is broadcasted for 2 minutes from 11:32, the "C section" is broadcasted between 11:34 and 11:54, and the "CM3" is broadcasted for 6 minutes from 11:54. In the "A section", a recipe of French cuisine is broadcasted, in the "B section", a recipe of Chinese cuisine is broadcasted, and in the "C section", a recipe of Indian cuisine is broadcasted. In addition, in the "CM1" and the "CM2," a food-related sponsor commercial is broadcasted, and in the "CM3" a magazine-related sponsor commercial is broadcasted.

And, to each section of the "A to C" and the "CM1 to CM3", an identifier is added respectively. As shown in FIG. 3 (*a*), this is an index where a user understands program names and section names at a glance, such as in the case of the "A section", [cooking program—French cuisine recipe], in the case of the "B section", [cooking program—Chinese cuisine recipe].

In addition, information about the broadcast time of each section can be added. In addition, an identifier of commercials is comprised of commercial unit such as "CM1", "CM2", and "CM3". Detailed information is added to each commercial. The information includes indexed company names of a commercial sponsor and commercial data such as related goods names. For example, [xxx confectionery—xxx chocolate], [xxx shop—xxx rice cracker] are shown in FIG. 3 (*b*). That is, whereas program data and program section data are merely endlessly recorded images, a time index is an index showing where and what programs and sections exist in this endless image.

(FIG. 4)

Figure 4:
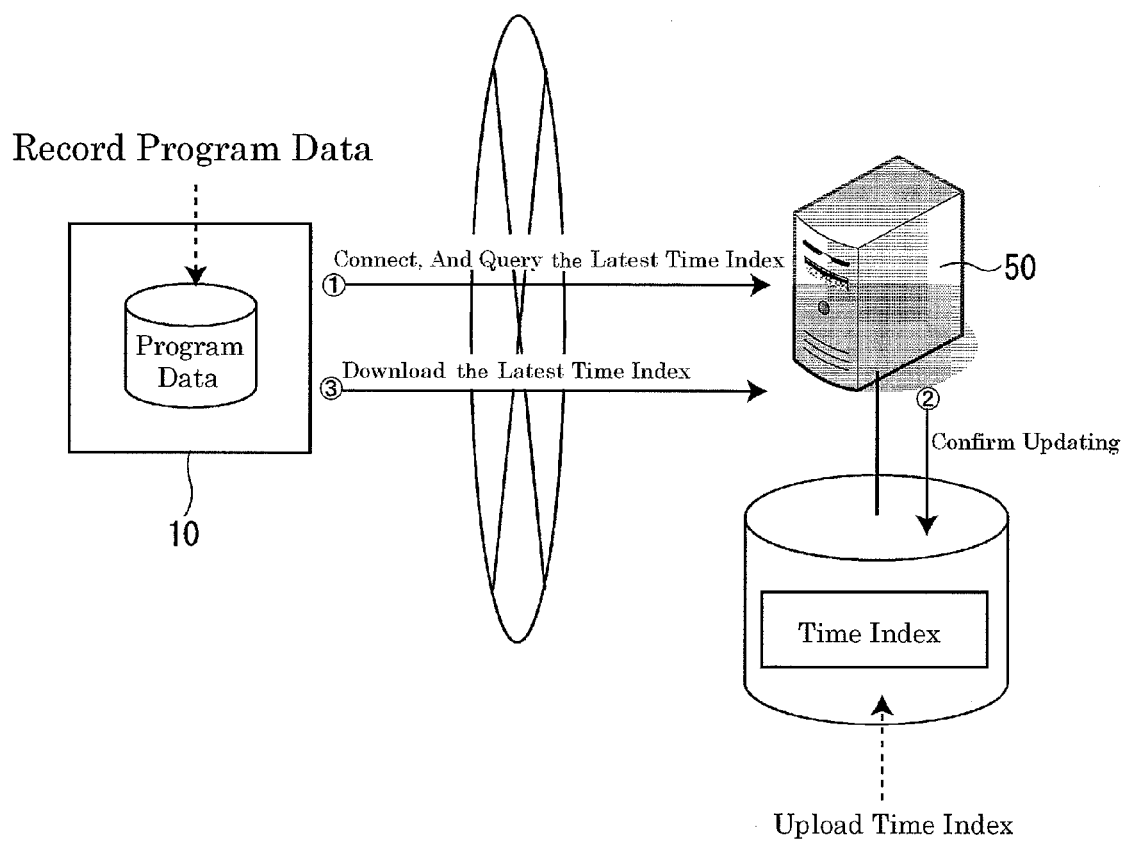
FIG. 4 is a conception diagram showing data transmission and reception between a digital recording/reproducing device and a server for time indexes.

In addition, as shown in FIG. 4, the mechanism which delivers the time index added with an identifier to the digital recording/reproducing device 10 operates as follows.

A time index corresponding to program data for delivery is uploaded to a server 50 for time indexes via Internet. On the other hand, the digital recording/reproducing device 10 is connected to the server 50 for time indexes via a network controller 26, and queries whether or not there is the latest time index, periodically.

Here, if it is confirmed that there is the latest time index, the time index is downloaded (by a time index receiving means) and the downloaded time index is stored in the HDD 17 (by a time index recording means).

In addition, when a user really views program data based on a time index, if the signal receiver 25 receives a reproducing signal from the remote controller or the input unit 28, the reproducing signal is sent to the CPU23 and the HDD control unit 18 detects an identifier corresponding to the reproducing signal, and then the program data associated with the detected identifier is extracted from the HDD17.

That is, by selecting the downloaded time index, the user can view the detailed program data such as section unit in the program and commercial information, in addition to the program unit. Thus, the user can quickly return to the top per a program data unit, per each section unit in a program, and it is possible for the viewer to search the desired target program quickly. In addition, for example, if a user wants to store sections in the program for a long term, he/she does not need to edit the sections.

In addition, a time index enables data transmission and receptions between a plurality of users, his/her recommendation program or program section data can be recommended to other users. This enables a user to send his/her recommendation program section data and the time index from the network controller 26 to the server 50 for time indexes, and then other users can efficiently view the program using them.
(Bit Rate Conversion Function)

Recording of program data adopts a bit rate conversion function. In this function, it is discriminated whether or not program data for 8 days of all channels (8 tuners) can be recorded not on the always recording HDD17*a*; if it is discriminated that it can be recorded, all programs are uniformly recorded with a preset compressibility; and if it is discriminated that it cannot be recorded, the compressibility of the program data to be record is changed every program genre and then the program data is recorded. The bit rate conversion function is mainly processed by the HDD control unit 18.

In addition, the "program genre" as described above stands for various program genres such as sport, drama, news, variety and movie.

In addition, the standard for compressibility is set as follows. Because news or variety has relatively little movement, the user has little problem with viewing due to the high compressibility. On the other hand, because sports or movies have fast movement, they are set with a low compressibility. In addition, dramas are set with these intermediate setting.

The process of the bit rate conversion function is further described. As shown in FIG. 4, the program genre dividing means previously divides the program data into a plurality of genres (S101). The compressibility setting means sets the divided program data to different compressibility every program genre (S102). A program genre/compressibility recording means associates the divided program genre with the compressibility set by the compressibility setting means and records into the program genre data base (S103). The program genre discriminating means discriminates whether or not program a plurality of program data newly received by the program data receiving means (S104) corresponds to the program genres in the program genre data base (S105). If the program data exists in the program genre data base, a program data compressing means compresses the program data with the compressibility of the corresponding program genre (S106).

That is, the program data is compressed with a preset compressibility every program genre and recorded with an automatically changed compressibility, and so in the case that the always recording must guarantee the record capacity of all programs for 8 days, the user can be more satisfied with the image quality in viewing as compared with recording with a high compressibility uniformly. In other words, the competing problems of saving the capacity of an HDD and improving the image quality can be solved.

In addition, if it is discriminated that the program data does not exist in the program genre data base, the program data compressing means may compress the program data with the compressibility of the program genre to which the program genre is approximate (S107). This copes with the case of receiving the program data of a new genre itself. This is suitable if the received program data does not exist in the program genre data base, or if the received program data is too detailed to be set about a program genre. For example, for a genre of "other", a program data approximation compressing means may be used.

In addition, if it is discriminated that a free space is short to record a plurality of program data by the free space discriminating means, it is discriminated whether or not the plurality of program data corresponds to the program genres in the program genre data base: and if the program genre of the program data exists in the program genre data base, the program data is compressed with the compressibility of the corresponding program genre.

This reserves free space in the always recording HDD17*a* when the always recording HDD17*a* has an insufficient free space. That is, if the free space discriminating means discriminates that a free space is short in the always recording HDD17*a* to record the program data, the program data is compressed with the compressibility of the corresponding program genre if the program genre of the program data exists in the program genre data base. As a result, it is not necessary to consider the free space of the always recording HDD17*a*, which results in improvement of convenience.

In addition, there is provided with a function for surely recording the program data for 8 days by previously calculating the capacity required to record the program data for 8 days by means of EPG data previously received. This is achieved by a record capacity discriminating means which calculates the total capacity required to record the program data for 8 days and discriminates whether or not the calculated total capacity can be recorded in the total capacity of the HDD17*a*; and a compressibility changing means for changing the compressibility set by the compressibility setting means to compressibility to fit into the capacity recordable in the total capacity of the HDD17*a*, if it is discriminated that the calculated total capacity exceeds the total capacity of the HDD17*a*.

Figure 5:
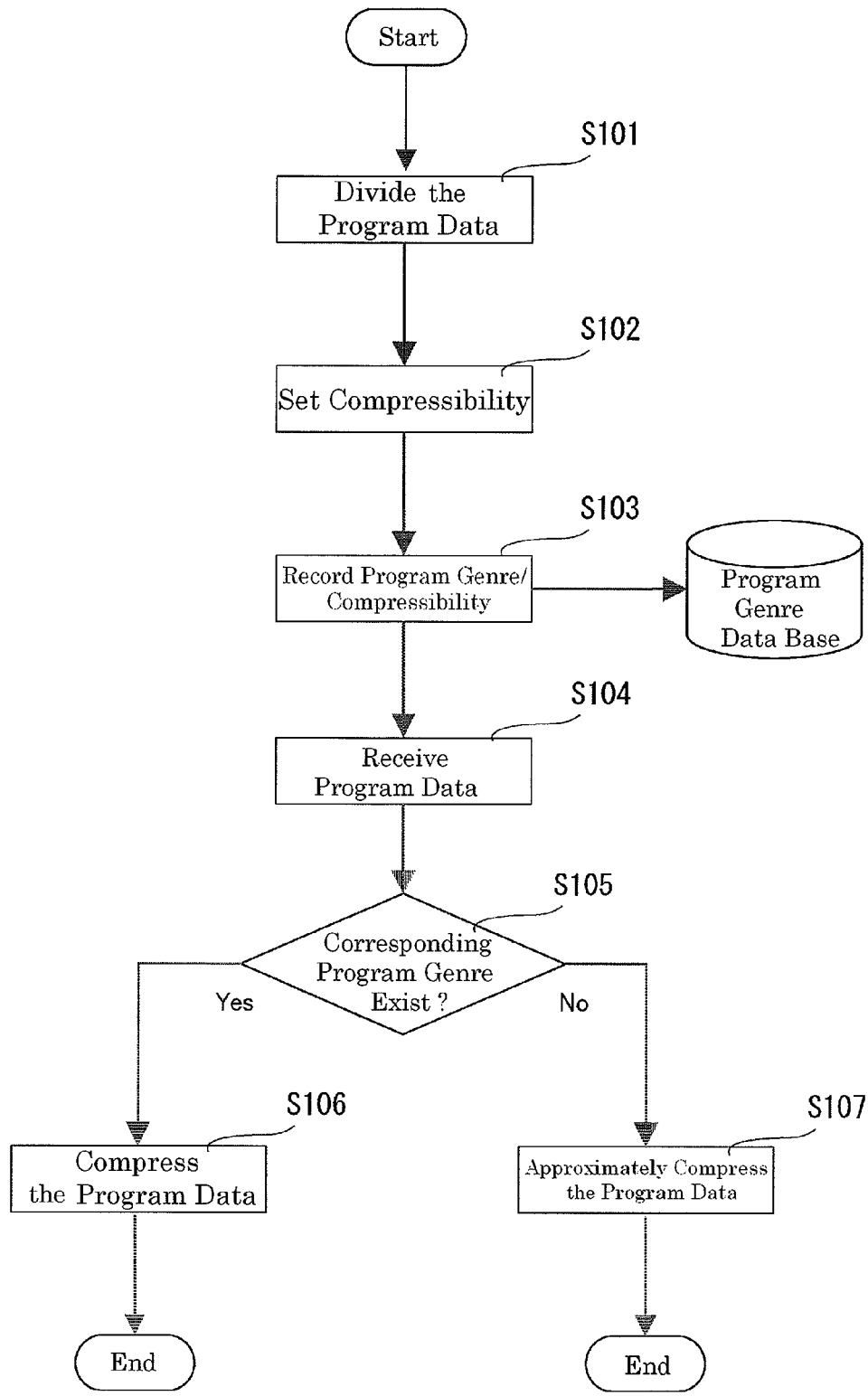
FIG. 5 is a flow diagram showing a procedure of bit rate conversion function.

As shown in FIG. 5, if the total capacity required to record the program data for 8 days by means of EPG data previously received is calculated (S201), the record capacity discriminating means discriminates whether or not the calculated total capacity can be recorded in the total capacity of the recording means (S202). If it is discriminated that the calculated total capacity exceeds the total capacity, the compressibility changing means changes the compressibility set by the compressibility setting means to the compressibility to fit into the capacity recordable in the total capacity of the recording means (S203).

In addition, as a logic of a compressibility change, for example, the higher quality image (=low compression) may be preferentially made low quality, and the compressibility may be uniformly changed by only the amount of overcapacity. As a result, regardless of the total capacity of the recording means, the program data for 8 days can be recorded surely.
(Deletion of Program Data)

Next, deletion of recorded program data will be described. The program data is automatically deleted from older program data when 8 days have elapsed. For example, in the case of Sunday, program data for 8 days from the Sunday to the next Sunday has been recorded, and then after AM 0:00 on next Monday, the HDD control unit 18 executes deletion instruction for last Sunday which corresponds to the oldest program data of the always recording HDD17*a*. That is, if program data of Sunday is pushed out and deleted, program data of Monday is added newly, and thus program data for 8 days is always stored in the always recording HDD17*a*.

In addition, the deletion of program data needs not to be synchronized with a reception timing of time data and can be changed by setting. In addition, the 8 days are set because there are many programs broadcasted every week, the days are extended by changing the setting or an extended HDD. However, if program data for 8 days are always recorded, various situations can be dealt with. For example, even if the user forgot to view last week's program data, he/she can view it continuously from last week's program when he/she views this week's program data.

In addition, the program data which is compressed and recorded in the always recording HDD17*a* is changed by a retention expiration warning means depending on retention period etc. as follows. For example, if the retention period is finished in two days to automatically delete the program data from the always recording HDD17*a*, the thumbnail of the program data is changed from a color display into a black and white gradation display. In addition, the font to display the program name changes into an old-fashioned font. In either case, a user can identify the program from other program data at a glance. Thus, a user can easily identify the program data wished to retain depending on the change of the time from a lot of program data recorded by always recording, which results in improvement of convenience of the user.

(No Signal Detection Function)

The digital recording/reproducing device 10 comprises the no signal detecting means. This is a function of making a HDD17 stop recording program data if it is detected that image signals sent from a tuner 12 are not received. That is, the no signal detecting means detects whether or not the non-image signal exists among the program data received by the program data receiving means. When the non-image signal is detected, the HDD control unit 18 stops the record instruction to the HDD. The recording means which is stopped once if the non-image signal is detected starts recording again if a image signal is detected.

As a result, in a no signal condition in which a program is not broadcasted, recording is stopped to save the record capacity in the HDD, which results in further long-time recording by the HDD.

(Personal Identification Function)

The digital recording/reproducing device 10 comprises a personal identification function which detects program data with high frequency of viewing by a user and associates the program data with a button of a remote controller, by which the user can access a desired target program data by pushing the button once.

The recording means comprises an identifying ID data base where identifying IDs for identifying a plurality of users are recorded; and the receiving means comprises an identifying ID discriminating means for receiving an identifying ID sent from a button per individual provided in the remote controller and discriminating whether or not the identifying ID is a set identifying ID. In addition, the top menu displaying means discriminates whether or not a top menu of a user relating to an identifying ID is displayed if the identifying ID discriminating means discriminates that the identifying ID has been set, and makes an output device display a top menu if the top menu is not displayed.

To detect the viewing frequency of a user, an individual menu screen is created for each user, and then the "button per individual" is assigned to the menu screen. For example, in the case of the viewing frequency, the following reproduced program data is acquired: a user 1 views a lot of TV programs in various genres, especially education TV programs; a user 2 often views news and sport programs; a user 3 often views a series of drama and a variety programs; and a user 4 does not view any TV programs except movies.

For acquired viewing information of program data for each user, a network controller 26 accesses a server via Internet and sends the data, and the server analyzes the viewing information. Then, individual favorite information program data is created, is sent to the digital recording/reproducing device 10, and is displayed on a menu screen of each user. In addition, the menu screen can also be created by registering the program data which a user views periodically or with high frequency in his/her menu screen. The user can display the created menu screen by pushing "a button per individual" one time.

Figure 6:
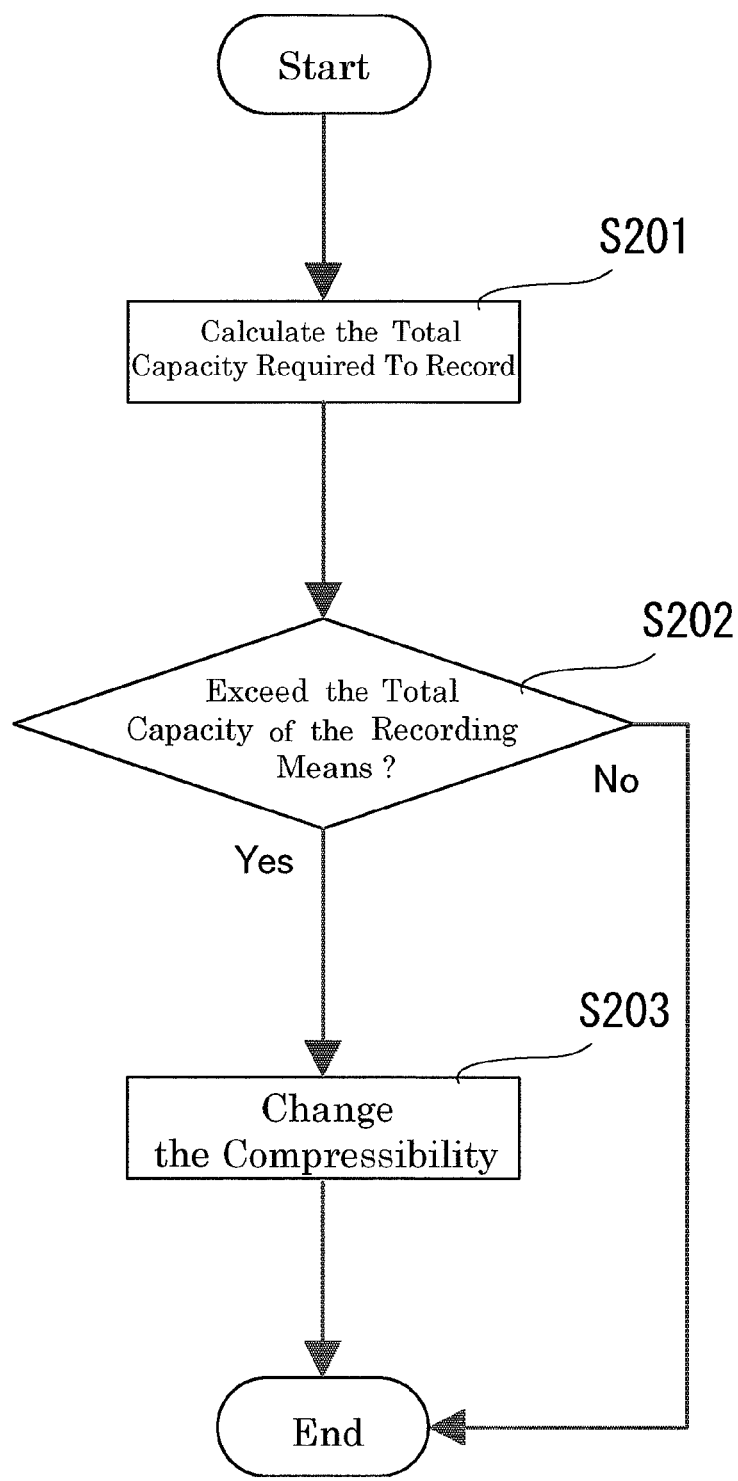
FIG. 6 is a flow diagram showing a procedure of bit rate conversion function (compressibility changing).

In addition, in a personal identification method, a button code and a distinguishing ID are used. Referring to FIG. 6, firstly, a distinguishing ID setting means sets a distinguishing ID for a "button per individual" (S301).

For example, in the case of a family with 4 members, 4 "buttons per individual" will be assigned to each of members. The distinguishing ID memory means stores the distinguishing ID assigned to the "buttons per individual" and button codes in a distinguishing ID data base (S302). If the "button per individual" is pushed on the remote controller, a signal receiver 25 receives the distinguishing ID (S303). The distinguishing ID discriminating means discriminates whether or not the received identifying ID is a set identifying ID with reference to the distinguishing ID data base (S304). If it has not been set, a setting screen of distinguishing Ms is displayed. If it has been set, the distinguishing ID discriminating means discriminates whether or not a top menu of a user relating to the distinguishing ID is displayed (S305). If the top menu is displayed, the process ends. If the top menu is not displayed, the top menu is displayed (S306).

In the conventional general digital recording/reproducing device (a general machinery), in the case of performing an operation of the recording/reproducing, the menu is layered from the top menu.

That is, the procedure necessary for reproducing the program in the general machinery (the conventional digital recording/reproducing device) requires steps of "displaying the top menu→displaying the reproducing menu→selecting a program." However, in the case that a plurality of users such as a family uses the general machinery, when the reproducing menu is displayed, all playable recorded program data are displayed. Therefore it is troublesome to select the program data in which a user is interested among them. Also, in the case of making directories per individual, as shown in "displaying top menu→displaying a reproducing menu→displaying individual menu→selecting program", one more step is added.

In contrast, in the digital recording/reproducing device 10 of the present invention, when the buttons per individual is pushed, the procedure becomes "setting buttons per individual on=displaying a menu per individual→selecting a program," by which the program data may be reproduced with very few operation, which will free the user from the inconvenience of sharing by a plurality of users.

The user may quickly access the top menu screen customized for one's exclusive use by pushing the button per individual, which results in improvement of convenience of the digital recording/reproducing device. Therefore, in particular, when the digital recording/reproducing device 10 is used by the plurality of users as a TV recording device shared within a family member, convenience will be remarkably improved.

In addition, a "button per individual" can serve as an on/off function of the TV power supply. This is a function of sending two different signals to the TV and the digital recording/reproducing device 10, respectively, when the button per individual is pushed. In the TV, the TV power supply is on, and in the digital recording/reproducing device 10, his/her own top menu pops up.

That is, with the on/off function of the TV power supply, when anyone of the family members tries to power on the TV and start TV recording, reproducing and viewing, he/she only needs to push the button once, by which the power is on and, which results in improvement of convenience.

In addition, a preset function enables to provide TVs of different makers with power on/off function, by which TVs of a plurality of TV makers can be handled.

(Interface of a Top Menu Screen)

The top menu screen shows a time and day determination menu, a program data storing menu, and a recommendation menu.

A time and day determination menu comprises: a time selection menu where times from 1 o'clock to 24 o'clock can be selected in a pull-down fashion or a scroll fashion; a day selection menu where days from Sunday to Saturday can be selected in a pull-down fashion or a scroll fashion; and a determination button which is selected when the day and time are determined and has a function as the program data reproducing signal. If a user selects the given time from the time selection menu, selects the given day from the day selection menu, and selects the determination button in a remote controller or a input unit 28, the time and day selection signal receiving means receives the time and day selection signal. And, the program data corresponding to the time and day selection signal is extracted from the always recording HDD17a and is reproduced. That is, in the time and day determination menu displayed on the top menu screen, if a user sets the time and day, he/her can reproduce desired target program data at high speed.

In the program data storing menu, when a user selects the program data storing menu in a remote controller or an input unit 28, the program data storing signal receiving means receives the program data storing signal.

And the program data corresponding to the received program data storing signal is recorded on the storing HDD 17b different from the always recording HDD17a. That is, for the program data that a user wants to store in particular, if a program data storing menu is selected, it can be stored on the storing HDD 17b. In addition, various setting article such as compressibility may be provided on the program data storing menu on the storing HDD 17b.

The recommendation menu realizes a function by which other users may view the program which a person views himself/herself and recommends, and when a user selects the recommendation menu in the remote controller or the input unit 28, the recommendation program signal receiving means receives the recommendation program signal which includes data for specifying a program such as a program ID, a program title, a broadcasting data and so on. And, the received recommendation program signal is sent to other users via a network. If a user selects the recommendation menu, he/she can send the recommendation program to other users. In this case, data for specifying a program such as a program ID, a program title, a broadcasting data are sent together, the digital recording device relating to the other users who received them reproduce the corresponding to the program data. According to the function, borrowing/lending among friends image data becomes needless, which results in improvement of convenience of the user.

(Next Program/Previous Program Function)

The digital recording/reproducing device 10 comprises a next program function and a previous program function. This digital recording/reproducing device comprises a signal receiving unit 25 which, during reproduction of program data, receives an access signal for performing the change per a program data unit and per a program section data unit, sent by the next program button or the previous program button of the remote controller; and a program database searching means which searches a program which is later or earlier than a currently reproduced program and which broadcast start time of the time index is the earliest or the latest in programs of the same channel from a data base. If there is an useful program as searched results, the controlling means stops reproducing the program data being reproduced, and reproduces the program data deemed useful as a searched result without changing screens such as returning to a menu screen after stopping the program being reproduced.

(FIG. 7)

Figure 7:
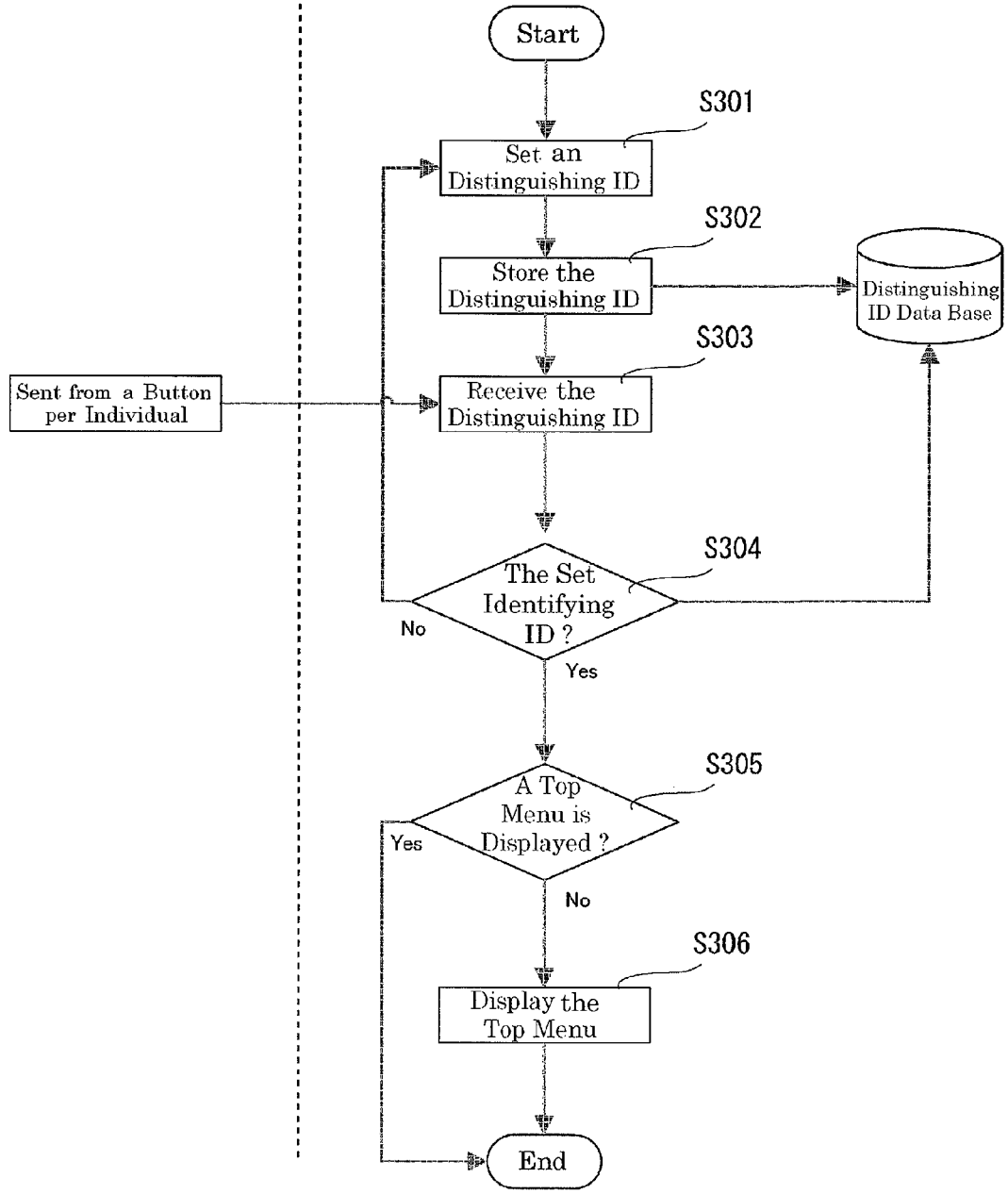
FIG. 7 is a flow diagram showing a procedure of a personal identification function.

The procedure is shown in FIG. 7. In addition, each program data is associated with an identifier of a time index, and this program data, can be sorted based on the given data set by a user, such as a time axis and a topic-related order. Firstly, if a "next program" button of the remote controller is pushed, the signal receiver 25 receives the access signal (S401).

The program data is detected from the signal receiver 25 by a CPU23 and a HDD control unit 18, and the detected program data is decoded via a demultiplexer 19 by a MPEG decoder 20 (S402).

Then, the program database searching means discriminates whether or not there is a time index to be effective to the access signal (S403), if there is an effective time index, the controlling means stops reproducing the program data being reproduced (S404). After the program being reproduced is stopped, the detected program data is reproduced (S405).

In addition, an effective time index stands for a condition that the next program has been recorded when the "next program button" is pushed. That is, because there is not program data at a border between the recorded program data and the program data broadcasted in real time, even if a user pushes the "next program button," there is not a recorded program, and so the program cannot be changed. In this case, the program database searching means discriminates that there is not an effective time index, an error indication outputted and the user returns to the menu just before that by which the program viewed last is selected and reproduced (S406).

(FIG. 8)

Figure 8:
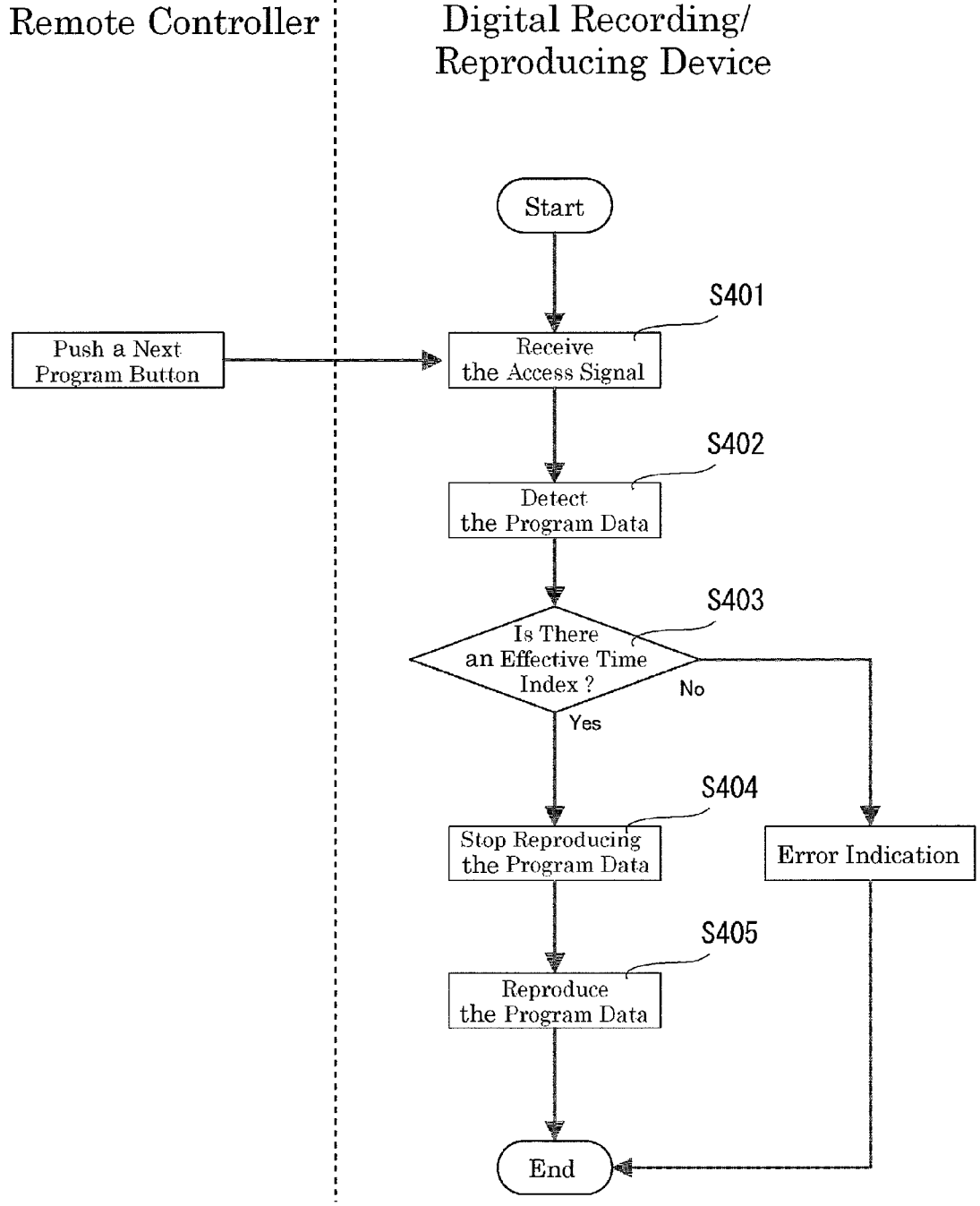
FIG. 8 is a flow diagram showing a procedure of a next program function.

Referring to FIG. 8, first, a "next program function" will be further described.

FIG. 8 is a conception diagram showing a shift form of the recording program data conceptually at the time of pushing the next program button. As shown in FIG. 8, a user is now viewing an animation program broadcasted from 19:00.

If the user pushes the "next program button" of the remote controller, the animation program recorded from 19:00 to 20:00 will be changed to a drama 1 recorded from 20:00 to 21:00. This change is performed per a program data unit such as an animation and a drama and per a program section unit in the program data, and such program data is reproduced without changing to a menu screen for selecting a program data.

In addition, as has been described previously, individual program data is associated with the identifier of the time index, and thus the program data is reproduced according to the identifier of this time index. That is, while an animation program at 19:00 is reproduced, when the next program button is pushed twice, a drama 2 recorded between 21:00 and 22:00 will be reproduced.

Figure 9:
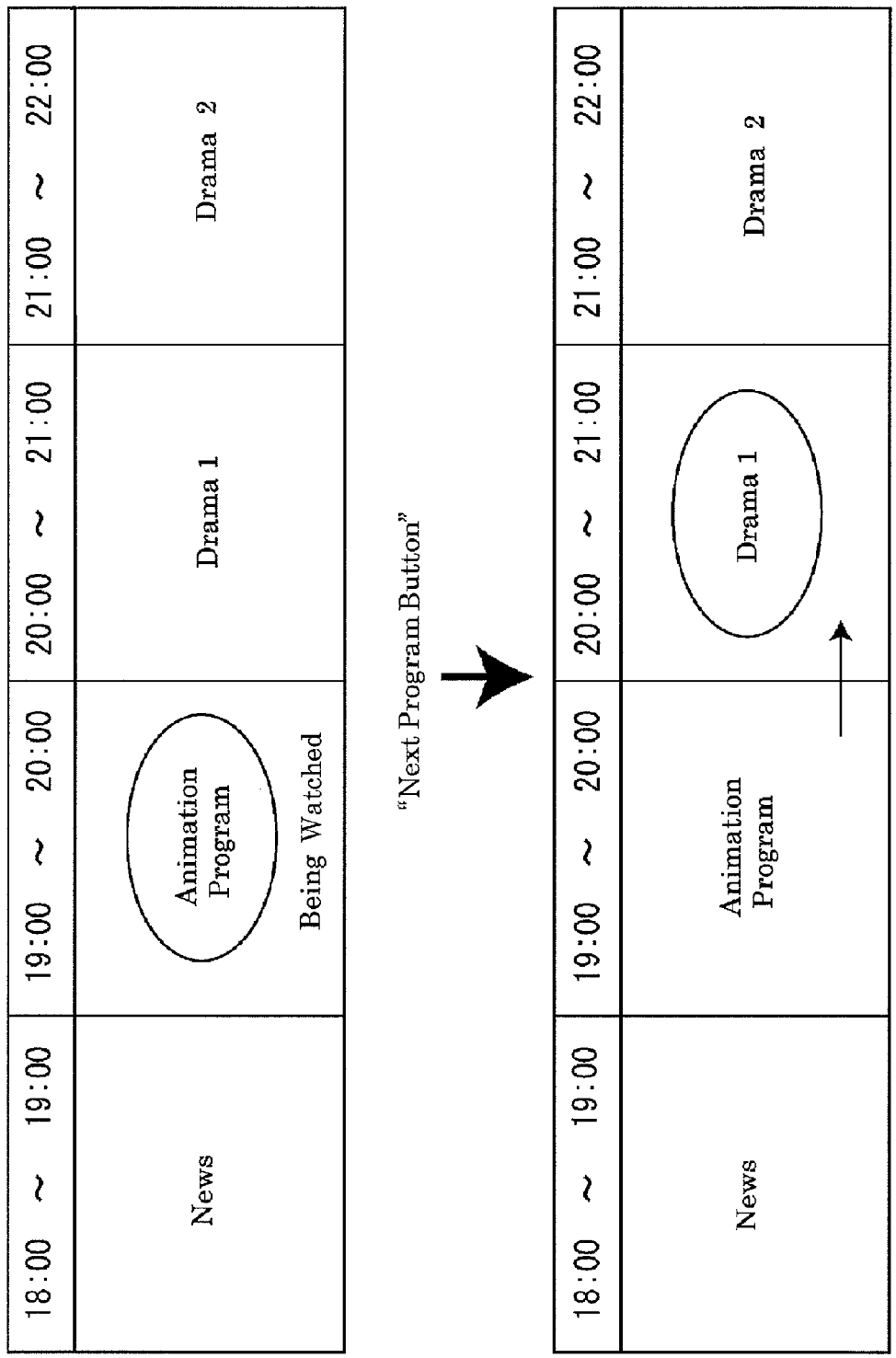
FIG. 9 is a conception diagram showing a shift form of a recording program data conceptually at the time of pushing the next program button.
Figure 10:
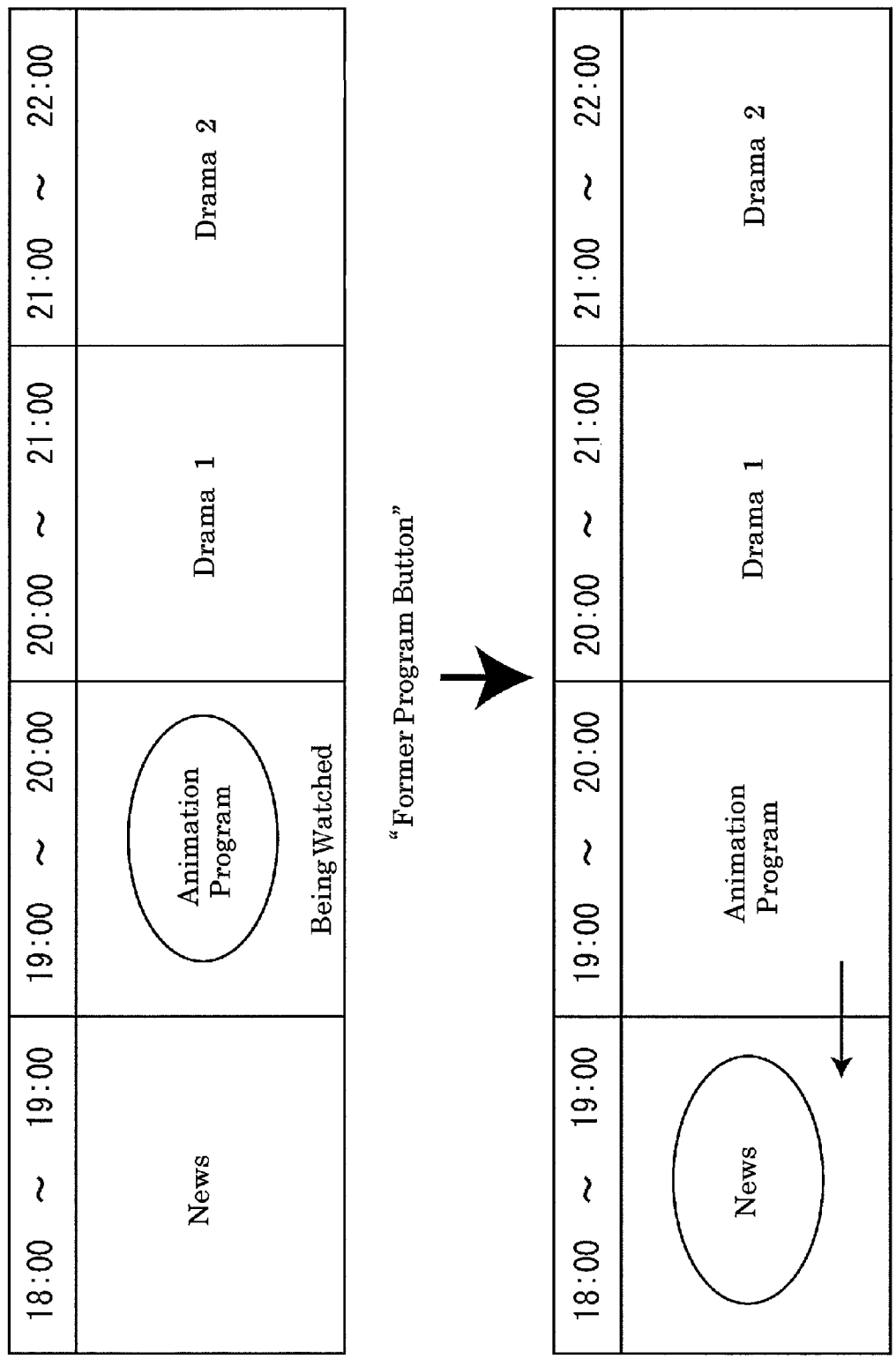
FIG. 10 is a conception diagram showing a shift form of the recording program data conceptually at the time of pushing the previous program button.

In addition, in a "previous program" function, when the "previous program" button of the remote controller is pushed, with the program data displayed on a TV, the program data which was recorded before the program data being reproduced at present is reproduced. As shown in FIG. 9, if the user pushes the "previous program" button while viewing an animation program broadcasted at 19:00, news which was recorded between 18:00 and 19:00 will be displayed instead of the animation program which was recorded between 19:00 and 20:00.

Generally, if a user wishes to view the recorded program data, it is necessary to switch the screen to a top menu screen for looking over a desired data program in recorded program data and selecting it from the TV screen where the program data are being projected. Then, desired program data is selected and it is returned to the TV screen. Also, after such selection is over, if the user wishes to view other program data, it is necessary to shift the screen to the layer of the menu screen again. This causes frequent switching of screens, which is troublesome.

However, if the "next program" function is used, only once pushing switches the screen to easily perform the change per a program data, which results in much convenience of the user.

(Channel-Switching-Function-at-the-Time-of-Past)

The channel-switching-function-at-the-time-of-past realizes a function in which if a signal receiving unit 25, during reproduction of program data, receives an access signal for performing the change per a program data unit and per a program section data unit, sent by the channel-switching-button-at-the-time-of-past of the remote controller, a program database searching means searches the program of other channels which was broadcasted on the same day and at the same time as ones of the program being reproduced from a data base. If there is an useful program as searched results, a program data stopping means stops reproducing the program data being reproduced. In addition, a program data reproducing means reproduces the program data deemed useful as a searched result without changing screens such as returning to a menu screen after stopping the program being reproduced.

For example, if a user pushes the channel switching button while reproducing the recorded news program broadcasted on "the 10th day, 18:00, 4 channel", a cooking program broadcasted on "the 10th day, 18:00, 4 channel" will be reproduced without changing screens. That is, programs which had been broadcasted at different broadcasting stations and recorded at the same time can be changed, which results in improvement of user's convenience when viewing program data.

(Rating Changing Function)

The digital recording/reproducing device 10 comprises a rating changing function. That is, the digital recording/reproducing device comprises a ranking list memory means which stores the ranking and list previously; and a rating list searching means for searching the program which is in the next or previous order of the program data being reproduced on the output device, if a receiving means received a access signal sent using the next program button or the previous program button of the remote controller.

The controlling means can display a rating and a list from the rating list recording means on the output device. If the receiving means received an instruction for reproducing the selected program data based on the list display, a controlling means reproduces the program data. The controlling means stops reproducing the program data being reproduced if the program data relating to the selection using rating or list as results searched by the rating list searching means exists. After stopping reproducing program data being reproduced, the controlling means reproduces the corresponding program data searched on the output device without changing screens.

A "rating" is, for example, a rating created based the topic-related order of the program, or a rating which is reflected as a program rating by searching blogs via Internet and collecting the searched results. If a user pushes the next program button or the previous program button while selecting a program based on these ratings and viewing it the user can start reproducing the program with the next rating order to the program which was viewing or the program with the previous rating order under the rating of the same program data previously selected, without returning to the rating selection screen and selecting a program again.

For example, if a user pushes the next program button while reproducing the 5th program data in the rating list where the high audience rating program of a week is rated, the 4th rated program will be reproduced without changing screens, and if the user pushes the previous program button, the 6th rated program will be reproduced without changing screens.

That is, the rated and listed program data may be viewed in turn without returning to the top menu screen. Therefore, convenience and operability when using the digital recording/reproducing device 10 is remarkably improved.

In addition, if one program data is associated with a plurality of identifiers of the time index, a user can select a plurality of sections that the user wants to view in the program data. For example, if a user views the today's recording of the Grand Sumo Tournament, the user select only matches of Yokozuna A, Ozeki B, and Komusubi C is selected. Then, suppose that a match of Komusubi C is first reproduced, and if a user pushes a "next program" button before the reproduction is over, the user can view a match of Ozeki B, and further if a user pushes a "next program" button, the user can view a match of Yokozuna A. Of course, after the user have selected a plurality of sections, if the user starts viewing and does not push a button, three matches of Komusubi C, Ozeki B, and Yyokozuna A are reproduce successively.

(Quick Viewing Function)

The digital recording/reproducing device 10 comprises a quick viewing function. With the quick viewing function, the time index of the section in the program or the scene to view a digest edition of the program is created by a server 50 for time indexes, and the user can pick up only the program section and the given scene designated by a digest edition time index among the program data recorded in the digital recording/reproducing device and view the program by receiving this time index, and can view the program quickly to use the time effectively.

(Storing Function)

The digital recording/reproducing device 10 comprises a storing function for program data in addition to a recording function for program data. In this storing function, the program data which the digital recording/reproducing device 10 recorded is stored for 8 days and then is automatically deleted. Thus, the program data which a user wants to store is stored on the on the storing HDD 17b. A user can store the program data by pushing the program data storage button of the input unit 28 or the remote controller. The program data stored on the storing HDD17b cannot be deleted unless an instruction for deleting formats or the like is executed.

In addition, if a user inserts a DVD-R which is an external storage medium into a DVD drive 29, the user can view the program data on a long storing and external digital reproducing devices.

In addition, the storing function can be performed not only by processes in hardware but also on the TV screen which is an output device. The storing function comprises a program data storing menu for storing program data on the top menu displayed by a TV. In this program data storing menu, a signal receiver 25 of the digital recording/reproducing device 10 receives a program data storing signal sent when the program data storing menu was selected by a remote controller or a input unit 28. And, the HDD control unit 18 as a control unit makes the storing HDD17b record store the program data corresponding to the received program data storing signal.

(Failure Support Function)

The digital recording/reproducing device 10 comprises a function to automatically back up the record position of the program data so as to prevent the previously recorded program data from being lost by overwriting in the case of restoration after failures such as a power failure. This function supports the case of troubles such as a power failure or unintended shut down, and is achieved by periodically recording the record positional data of the program data in other file while recording the program data on the always recording HDD17a.

The record positional data of the program data stands for data by which a record positional data grasping means always grasps the record position of the program data recorded on the always recording HDD17a by ring buffer method. And the digital recording/reproducing device starts recording again with reference to the record position data recorded in the other file after restoration from troubles such as power failure or the like.

Thus, this allows to prevent the previously recorded program data from being lost by overwriting, after restoration from troubles such as power failure or unintended shut down. In addition, the other file in which the record positional data is recorded is recorded on one or both the always recording HDD17a and the storing HDD17b.

(Rebroadcasted Program Support)

The digital recording/reproducing device 10 comprises a replacement function of rebroadcasted program data. This is achieved by processes of searching the old program data before being rebroadcasted based on rebroadcast information added to a time index and then replacing the old data with the rebroadcasted program data. Thus, for the program rebroadcasted within 8 days, the rebroadcast date becomes a new recording date, from which the program is further stored for 8 days. Therefore, the retention period can be extended.

In addition, a compression method of image data used by a MPEG encoder 14 and a MPEG decoder 20 may be either MPEG-2 or MPEG-4. In addition, other compression methods except MPEG can be used for a compression method of image data. For example, a compression method may also be AVI, DivX, XVD, H.264, XVid, etc.

(Viewing Administration Function)

The digital recording/reproducing device 10 comprises a viewing administration function wherein an administrator can set viewing restrictions to a particular user and restrict the reproduction of the program corresponding to the set viewing restrictions.

In addition, for purposes of this description, an administrator is discussed as being parents and a particular user is described as being a child, but the invention is not limited to this example.

(Viewable Time Restriction Function)

In a viewable time restriction function, parents previously set a "viewable total time" as a viewable time of a program to a child, and if the "viewable total time" was reached, the reproduction of the program becomes impossible. The viewable total time can be set in units of days, weeks, and months. For example, the viewable total time may be set to 2 hours per day, 14 hours per week, 50 hours per month, etc. According to the viewable time restriction function, the parents can give the time frame where the child can view, which results in prevention of excessive viewing of a TV. And, if the "viewable total time" is exceeded, viewing automatically becomes impossible, and thus the parent does not need to check the viewing time of the child, for example, when he/she goes out, which results in improvement of administration.

(Point Setting Function)

A point setting function is a function to administer a program by points, and a "viewable point" is necessary to view a program. Parents set this "viewable point" to a child previously. That is, the viewable time restriction function restricts viewing by times, but the point setting function restricts viewing by points. For example, parents set the "viewable point" of 20 points to a child, if a program point per program is 1 point, the child can view up to 20 programs, but cannot view further according to the viewing restriction. In addition, if a child viewed not less than one minute, the program is counted as having been viewed, and if less than one minute, as not counted as having viewed.

In addition, parents can change the required number of viewable points depending on the kind of a program. This allows the parents to set the viewable point of one point for the program which the parents positively want the child to view, but further allows the parents to set the viewable point of 2 points for the program which parents do not want to make a child positively view. Examples of setting one point include an education program, an intellectual training program, a documentary, etc., and examples of setting 2 points include animation, variety, dramas, movies, etc. That is, restricting viewing by points enables more detailed viewing administration in addition to time restriction. This enables a more detailed viewing restriction to be set depending on age of a child.

As described above, in the point setting function, a parent who is an administrator set the point and can also change the point on the way. For example, if the parent recognized good cases such that the child got good grades or high test score, or did the child's homework, the parent increase the "viewable point". On the other hand, if the parent recognized bad cases such that the child got bad grades or low test score, forgot to do the child's homework, or quarreled with the child's friend, the parent decreases the "viewable point" That is, the parent can administer the child's TV viewing depending on good or bad of daily activities of the child.

(Rating Data Setting Function)

A rating data setting function is a function to restrict viewing depending on the rating data which shows rating classification previously applied to a program. For example it is assumed that a program's rating is classified into three groups of pine, bamboo, and plum (A, B, C). In this ease, it requires one point of "viewable point" to view a program with "rating pine (A)", it requires two points of "viewable point" to view a program with "rating bamboo (B)", and it requires three points of "viewable point" to view a program with "rating plum (C)". "Rating plum (C)" corresponds to a program as referred to as so-called a tabloid show. That is, a parent can restrict the program which has the adverse effect from an educational standpoint.

In addition, the rating data applied to a program is considered to be previously determined by a program delivery server to manage the rating data. In addition, the program delivery server receives provisional rating data to be a criterion by which to judge whether a program has an adverse effect or a positive effect on a child, and a program creator or a sponsor may set the "rating" based on the provisional data. If the rating data is set, a child cannot view only the programs that the high point such as "rating plums (C) is necessary". In addition, because the rating data is a criterion by which to judge whether a child is allowed to view the program, parents can easily restrict viewing.

(Quiz Function)

A quiz function is a function wherein a child answers a delivered quizzes, and only if he/she gives a correct answer, the child can view a program. This delivered quizzes are questions of a level to be solved if the child do the child's homework, and a plurality of educational quizzes are prepared according to age (scholastic year) and ability of the child. Parents appropriately select the quiz according to the child, and set the number of correct answers for the child to be allowed to view the problem. Preferably, an answer method is a multiple choice system (ex. four alternative forced choice) in which a child can easily select the answer by a remote controller.

That is, for a child to view the child's desired program, the child has to answer the quiz correctly, and has to study or do the child's homework to solve the quiz. Thus, the child can be expected to study spontaneously rather than forced to study by the child's parent.

In addition, a quiz contents producer which creates and provides quizzes for questions may deliver intentionally as an educational program that built each curriculum systematically. In this case, an effect can be expected in sales promotion of teaching materials such as correspondence educations, which the quiz contents producer provides separately.

(Recommendation Program Function)

A recommended program function, a function which allows a child to view other programs by viewing "the recommended program" sent by parents. For example, it is assumed that parents want to show the program of the "macrocosm cruise" to a child. For this case, if the "macrocosm cruise" is registered and set on the recommendation program register column for children, when a child made the digital recording/reproducing device 10 start by the "button per individual," a screen to urge to view the "macrocosm cruise" is displayed. And the child can select and view other programs only after viewing the "macrocosm cruise". As a result, because the parents can semi-forcefully make the child view the program which they want the child to view, the digital recording/reproducing device 10 can be used as an education auxiliary.

In addition, there is provided with a function that a viewing record such as the name or the time of the program which a child viewed is collected as the log which can be output in units of days, weeks, and months.

(Server)

A server relating to the present embodiment comprises at least the following functions: a time adjusting means for periodically sending time data to adjust the time of a clock of the digital recording/reproducing device 10; a time index sending means for sending a time index to the digital recording/reproducing device 10; a program data sending means for sending data specifying a program for specifying program data and data specifying a section for specifying program section data to the digital recording/reproducing device 10; a user information receiving means for receiving the time index which the user created from the digital recording/reproducing device 10 and viewing information; a processed information generating means for generating processed information by processing the received time index and viewing information; and a time index delivering means for delivering generated processed information and a time index before processing to the digital recording/reproducing device 10.

Viewing information stands for information that a reproduction channel, reproduction date, reproduction status (normal reproduction, forward, rewind, etc.), a reproduction user identifier, a terminal identifier, program status (my menu ?, saved ?, designated by a time index ?), program assessment data (good or no-good), and recommendation data by viewer are recorded in seconds.

"Data specifying a program" stands for, for example, the broadcast wave which includes digital data converted from an analog signal to a digital signal by an A/D converter, and which also includes image data and audio data.

"Data specifying a section" stands for data of each section unit and CM unit of program data. In addition, it stands for data on data for specifying a given section in a certain program, for example, the time until the section will start as well as the broadcasting channel and the broadcast start time of the program, or, the broadcasting channel of the program and the broadcast start time of the section.

"Processed information" stands for viewing information, a time index and a topic index of programs, assessment data, a quality of viewing, an audience rating, and number of viewers which are generated by statistically processing data such as blogs or bulletin boards on Internet.

If a personal identification function or a two-way communication function via a network is used, the following usage may be possible. That is, if the user gave high mark to the given program (by a "good or no-good" button etc.), he/she can recommend an program given high mark to persons in the group associated with himself/herself (previously set as friends by himself/herself, or grouped into persons having similar viewing history by a system) by pushing a "recommendation button".

INDUSTRIAL APPLICABILITY

The present invention has applicability in manufacturing industry and sales industry of digital recording/reproducing devices, data service industry concerning digital recording/reproducing devices, service industry of providing program data, data processing industry concerning program data, etc.

The invention claimed is:

1. A digital recording/reproducing device which comprises a plurality of tuners which can receive a plurality of television signals at the same time; a converter by which the tuners convert a television signal into a digital signal; a recording means for recording program data converted by the converter; and a receiving means for receiving an operation signal relating to reproducing the program data recorded in the recording means, and which reproduces the program data on an output device based on the operation signal which the receiving means received, comprising:

a time index receiving means for receiving a time index having an identifier which can identify the program data relating to a television signal and a plurality of program section data consisting of the program data, from a server for time indexes which stored the time index, via a communicating means;

a time index recording means for recording a received time index on the recording means; and a controlling means for detecting an identifier of the time index relating to the program data corresponding to the operation signal which the receiving means receives, extracting the program data associated with a detected identifier from a recording means, and issuing an instruction for reproducing on the output device, wherein in the recording means, means, a ring buffer method is adopted where a data area is in a loop form, a data configuration is formed so that the area is handled as an area with hypothetically a limitless length, and program data to be recorded is recorded as one endless recording file every tuner.

2. A digital recording/reproducing device as claimed in claim 1, comprising:
   a compressibility setting means for previously dividing program data into a plurality of program genres and setting different compressibility every program genre;
   a program genre database where a plurality of divided program genres are associated with the compressibility set by the compressibility setting means and are recorded;
   a program genre discriminating means for discriminating whether program data newly received corresponds to the program genres in the program genre data base;
   a program data compressing means for compressing the program data with the compressibility of the corresponding program genre if the program data exists in the program genre data base; and
   a program data approximation compressing means for compressing the program data by the compressibility of the program genre to which the program genre is approximate if the program data does not exist in the program genre data base.

3. A digital recording/reproducing device as claimed in claim 1, wherein the controlling means comprises:
   the free space discriminating means which discriminates whether or not there is the free space needed to record the program data in the recording means; and
   the oldest data deleting means for deleting the oldest program data among the program data recorded in the recording means and reserving the free space if it is discriminated that the free space is short, and
   wherein the recording means records the program data in the free space reserved by means of the oldest data deleting means.

4. A digital recording/reproducing device as claimed in claim 1,
   wherein the controlling means comprises a free space discriminating means which discriminates whether or not there is the free space needed to record the program data in the recording means, and
   if it is discriminated that the free space to record a plurality of program data is short based on the free space discriminating means, the controlling means discriminates whether or not the program data corresponds to a program genre in the program genre data base, and compresses the program data with the compressibility of the corresponding program genre if the program genre of the program data exists in the program genre data base.

5. A digital recording/reproducing device as claimed in claim 1, comprising an EPG data recording means for acquiring and recording EPG data,
   wherein the controlling means comprises:
   a record capacity discriminating means which calculates the total capacity required to record the program data for 8 days by means of EPG data recorded by the EPG data recording means and discriminates whether or not the calculated total capacity can be recorded in the total capacity of the recording means; and
   a compressibility changing means for changing the compressibility set by the compressibility setting means to compressibility to fit into the capacity recordable in the total capacity of the recording means if it is discriminated that the calculated total capacity exceeds the total capacity of the recording means.

6. A digital recording/reproducing device as claimed in claim 1, wherein the controlling means comprises a record positional data grasping means for always grasping the record position of the program data recorded in said recording means during recording the program data in the recording means.

7. A digital recording/reproducing device as claimed in claim 1, comprising a retention expiration warning means for changing a color of the thumbnail or a font to display the program name about said program data if the retention period falls within the given period before expiration in the program data recorded in the recording means.

8. A digital recording/reproducing device as claimed in claim 1, comprising a no-signal detecting means for detecting whether or not a non-image signal exists in television signals received by the tuner, and a program data recording stop means for stopping a record instruction to the recording means if the non-image signal is detected.

9. A digital recording/reproducing device as claimed in claim 1, wherein the controlling means comprises a menu displaying means for displaying a menu display for a user operation on the output device, and the menu displaying means comprises a top menu displaying means for displaying a menu about the first operation;
   the recording means comprises an identifying ID data base where identifying IDs for identifying a plurality of users are recorded;
   the receiving means receives comprises an identifying ID discriminating means for an identifying ID sent from a button per individual provided in the remote controller and discriminating whether or not the identifying ID is a set identifying ID; and
   the controlling means discriminates whether or not a top menu of a user relating to an identifying ID is displayed if it is discriminated that the identifying ID has been set by the identifying ID discriminating means, and makes the output device display a top menu if the top menu is not displayed.

10. A digital recording/reproducing device as claimed in claim 1, wherein the controlling means comprises a menu displaying means for displaying a menu display for a user operation on the output device, and the menu displaying means comprises a top menu displaying means for displaying a menu about the first operation;
    the top menu displaying means comprises a user selection menu which can select a particular user from a plurality of users, and
    the receiving means comprises a user selection menu signal receiving means for receiving a user selection menu signal sent when the remote controller or the input unit selects a particular user, and makes the output device display said user's own top menu based on the user selection menu signal received by the user selection menu signal receiving means.

11. A digital recording/reproducing device as claimed in claim 1, wherein the controlling means comprises a menu displaying means for making the output device output a menu display for a user operation, and the menu displaying means comprises a time and day determination menu comprised of:
    a time selection menu where times from 1 o'clock to 24 o'clock can be selected in a pull-down fashion or a scroll fashion;
    a day selection menu where days from Sunday to Saturday can be selected in a pull-down fashion or a scroll fashion; and
    a determination button which is selected when the day and time are determined and has a function as the program data reproducing signal;

the receiving means comprises a time and day selection signal receiving means which receives a the time and day selection signal sent by selecting the given time from the time selection menu, selecting the given day from the day selection menu, and selecting the determination button in a remote controller or a input unit; and the controlling means extracts the program data corresponding to the time and day selection signal which the time and day selection signal receiving means received, from the recording means and makes the output device reproduce the program data.

12. A digital recording/reproducing device as claimed in claim 1, comprising a means for recording for exclusive use of storing physically different from the recording means, wherein the controlling means makes the means for recording for exclusive use of storing store said program data based on the instruction to store the program data in the means for recording for exclusive use of storing.

13. A digital recording/reproducing device as claimed in claim 1, wherein the controlling means comprises a menu displaying means for making the output device output a menu display for a user operation;

the menu displaying means comprises a recommendation menu for recommending given program data to other users;

the receiving means comprises a recommendation program signal receiving means for receiving a recommendation program signal, which is sent when the recommendation menu is selected in the remote controller or the input unit and which includes data for specifying said program data; and the controlling means sends the recommendation program signal which the recommendation program signal receiving means received via a network.

14. A digital recording/reproducing device as claimed in claim 1, wherein a favorite-flag that program data matches said user's favorite of the digital recording/reproducing device in this claim can be previously recorded in the recording means;

the top menu displaying means comprises an auto-reproducing menu;

the receiving means comprises an auto-reproducing menu signal receiving means which receives an auto-reproducing menu signal sent when an auto-reproducing is selected in the remote controller or the input unit; and the controlling means extracts program data relating to the favorite-flag from the recording means and makes the output device reproduce if the auto-reproducing menu signal receiving means receives the auto-reproducing menu signal.

15. A digital recording/reproducing device as claimed in claim 1, comprising a program database searching means for searching a program which is later or earlier than a currently reproduced program and which broadcast start time of the time index is the earliest or the latest in programs of the same channel from a data base if during reproduction of program data, the receiving means receives an access signal for performing the change per a program data unit and per a program section data unit, sent from the remote controller as an operation to show a next program or a previous program;

wherein the controlling means stops reproducing program data being reproduced if corresponding program data searched by the program database search means exists, and reproduces the corresponding program data searched on the output device without changing screens after stopping reproducing program data being reproduced.

16. A digital recording/reproducing device as claimed in claim 1, comprising a program database searching means for searching the program of other channels which was broadcasted on the same day and at the same time as ones of said program being reproduced from a data base if during reproduction of program data, the receiving means receives an access signal for performing the change per a program data unit and per a program section data unit, sent from the remote controller as an operation to show a channel switching;

wherein the controlling means stops reproducing program data being reproduced if corresponding program data searched by the program database search means exists, and reproduces the corresponding program data searched on the output device without changing screens after stopping reproducing program data being reproduced.

17. A digital recording/reproducing device as claimed in claim 1, comprising a rating list recording means for previously recording a rating list;

wherein the controlling means can display a rating and a list from the rating list recording means on the output device;

comprising a rating list searching means for searching program data which is in the next or previous order of the program data being reproduced by the output device, if during reproducing a program relating to the listing, the receiving means receives an access signal for performing the change per said rating unit, sent from the remote controller as an operation to show the next program or the previous program; and wherein the controlling means stops reproducing the program data being reproduced if the program data relating to the selection using rating or list as results searched by the rating list searching means exists, and reproduces the corresponding program data searched on the output device without changing screens after stopping reproducing the program data being reproduced.

18. A digital recording/reproducing device as claimed in claim 1, wherein the time index receiving means receives a given time index where only given scene of program data is extracted and a digest edition time index comprising time indexes of a plurality of extraction scenes;

the time index recording means records a received given time index and a digest edition time index; and the controlling means makes the output device reproduce based on instructions relating to a given time index or a digest edition time index.

19. A digital recording/reproducing device as claimed in claim 9, comprising a viewable total time setting means for setting a viewable total time when a user can view program data, and a viewable total time discriminating means which discriminates whether or not a set viewable time is reached;

wherein the viewable total time set to a particular user and the result discriminated by the viewable total time discriminating means are recorded in the identifying ID data base; and wherein the controlling means controls so that the reproduction of program data or the output by the output device becomes impossible, if the viewable total time is reached.

20. A digital recording/reproducing device as claimed in claim 9, comprising a user viewing point which is increased or decreased depending on good and bad of a behavior pattern of a particular user and a point setting means for setting a viewable point required to view each program data; and wherein the identifying ID data base records a user viewing point set for a particular user by a point setting means;

a recording means records a viewable point corresponding to each program data; and the controlling means controls so that the reproduction of program data or the output by the output device becomes impossible, if the user viewing point recorded in the identifying ID data base is not reached the viewable point required to view the program data relating to reproduction instruction.

21. A digital recording/reproducing device as claimed in claim 19, comprising a server receiving means for receiving a quiz for education for a particular user and the correct answer delivered by a server; and wherein the controlling means makes the output device output the quiz for education which the server receiving means received;

the receiving means receives answer data sent by the particular user; and the controlling means controls so that the reproduction of program data or the output by the output device becomes impossible, if the correct answer does not correspond with the answer data at above a given rate.

22. A digital recording/reproducing device as claimed in claim 19, comprising a server receiving means for receiving data specifying a program about a recommendation program for a particular user delivered by a server, wherein the receiving means receives a user ID for specifying a user relating to the recommendation program from a plurality of users;

the controlling means makes the output device output the program data relating to the data specifying a program which is received by the server receiving means, if the receiving means received said user ID; and the controlling means controls so that the reproduction of other program data or the output by the output device becomes impossible, if both the reception of a given user ID and the successful completion of the program data output are not satisfied.

\* \* \* \* \*